US012762194B2

(12) United States Patent
Yang et al.

(10) Patent No.: US 12,762,194 B2
(45) **Date of Patent: *Oct. 13, 2026**

(54) ARTIFICIAL INTELLIGENCE AND CONTENT DELIVERY DURING CHARGING

(71) Applicant: TOYOTA MOTOR NORTH AMERICA, INC., Plano, TX (US)

(72) Inventors: Christopher E. Yang, Frisco, TX (US); Geoffrey David Gaither, Ann Arbor, MI (US); James G. Swartz, Prosper, TX (US); James D. Wilder, Dallas, TX (US); Frederick W. Mau, Plano, TX (US)

(73) Assignees: TOYOTA MOTOR NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 18 days.

This patent is subject to a terminal disclaimer.

(21) Appl. No.: 19/019,629

(22) Filed: Jan. 14, 2025

(65) Prior Publication Data

US 2025/0252141 A1 Aug. 7, 2025

Related U.S. Application Data

(63) Continuation of application No. 18/431,866, filed on Feb. 2, 2024, now Pat. No. 12,216,721.

(51) Int. Cl.
*G06F 16/9535* (2019.01)
*B60W 40/08* (2012.01)

(52) U.S. Cl.
CPC ......... *G06F 16/9535* (2019.01); *B60W 40/08* (2013.01); *B60W 2040/0881* (2013.01)

(58) Field of Classification Search
CPC .............. G06F 16/9535; B60W 40/08; B60W 2040/0881
See application file for complete search history.

(56) References Cited

U.S. PATENT DOCUMENTS

| | | | |
|---|---|---|---|
| 11,501,338 B2 | 11/2022 | Menendez et al. | |
| 12,216,721 B1 * | 2/2025 | Yang | G06F 16/9535 |
| 2016/0337059 A1 | 11/2016 | Nehls et al. | |
| 2018/0370379 A1 | 12/2018 | Chen et al. | |

(Continued)

FOREIGN PATENT DOCUMENTS

| | | |
|---|---|---|
| CN | 117132038 A | 11/2023 |
| DE | 102021001377 A1 | 4/2021 |

(Continued)

OTHER PUBLICATIONS

Sabga-Aboud, Why Netflix Will Likely Remain the King of Streaming Feb. 21, 2022 , Netflix, Inc. (NFLX) Stock.

(Continued)

*Primary Examiner* — Hussein Elchanti

(57) ABSTRACT

An example operation includes one or more of determining an expected charging duration of an electric vehicle (EV) at a charging point, determining content preferences of an occupant associated with the EV, wherein the content preferences are based on profile data of the occupant associated with the occupant, and delivering content to the EV, based on the expected charging duration and the content preferences.

20 Claims, 25 Drawing Sheets

(56) References Cited

U.S. PATENT DOCUMENTS

| | | | |
|---|---|---|---|
| 2019/0294135 A1 | 9/2019 | Madrid et al. |
| 2020/0097606 A1 | 3/2020 | Hamilton et al. |
| 2023/0093609 A1 | 3/2023 | Moravick et al. |
| 2023/0113027 A1 | 4/2023 | Logvinov et al. |
| 2023/0302374 A1 | 9/2023 | Deuel et al. |
| 2023/0384105 A1 | 11/2023 | Hu et al. |

FOREIGN PATENT DOCUMENTS

| | | |
|---|---|---|
| KR | 20110004293 A | 1/2011 |
| WO | 2017040924 A1 | 3/2017 |
| WO | 2017088409 A1 | 6/2017 |
| WO | 2023126688 A1 | 7/2023 |

OTHER PUBLICATIONS

Scognamigio, Netflix Recommendation System: Inside the Algorithm, Oct. 26, 2020, https://mikescogs20.medium.com/netflix-recommendation-system-inside-the-algorithm-55edc1712748.

* cited by examiner

250

300D

300E

400C

400E

500B

ARTIFICIAL INTELLIGENCE AND CONTENT DELIVERY DURING CHARGING

CROSS-REFERENCE TO RELATED APPLICATIONS

This application is a continuation of U.S. application Ser. No. 18/431,866, filed on Feb. 2, 2024, the entire disclosure of which is incorporated by reference herein.

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of determining an expected charging duration of an electric vehicle (EV) at a charging point, determining content preferences of an occupant associated with the EV, wherein the content preferences are based on profile data of the occupant associated with the occupant, and delivering content to the EV, based on the expected charging duration and the content preferences.

Another example embodiment provides a system that includes a memory communicably coupled to a processor, wherein the processor performs one or more of determine an expected charging duration of an EV at a charging point, determine content preferences of an occupant associated with the EV, wherein the content preferences are based on profile data of the occupant associated with the occupant, and deliver content to the EV, based on the expected charging duration and the content preferences.

A further example embodiment provides a computer readable storage medium comprising instructions, that when read by a processor, cause the processor to perform one or more of determining an expected charging duration of an EV at a charging point, determining content preferences of an occupant associated with the EV, wherein the content preferences are based on profile data of the occupant associated with the occupant, and delivering content to the EV, based on the expected charging duration and the content preferences.

DETAILED DESCRIPTION

Figure 1A:
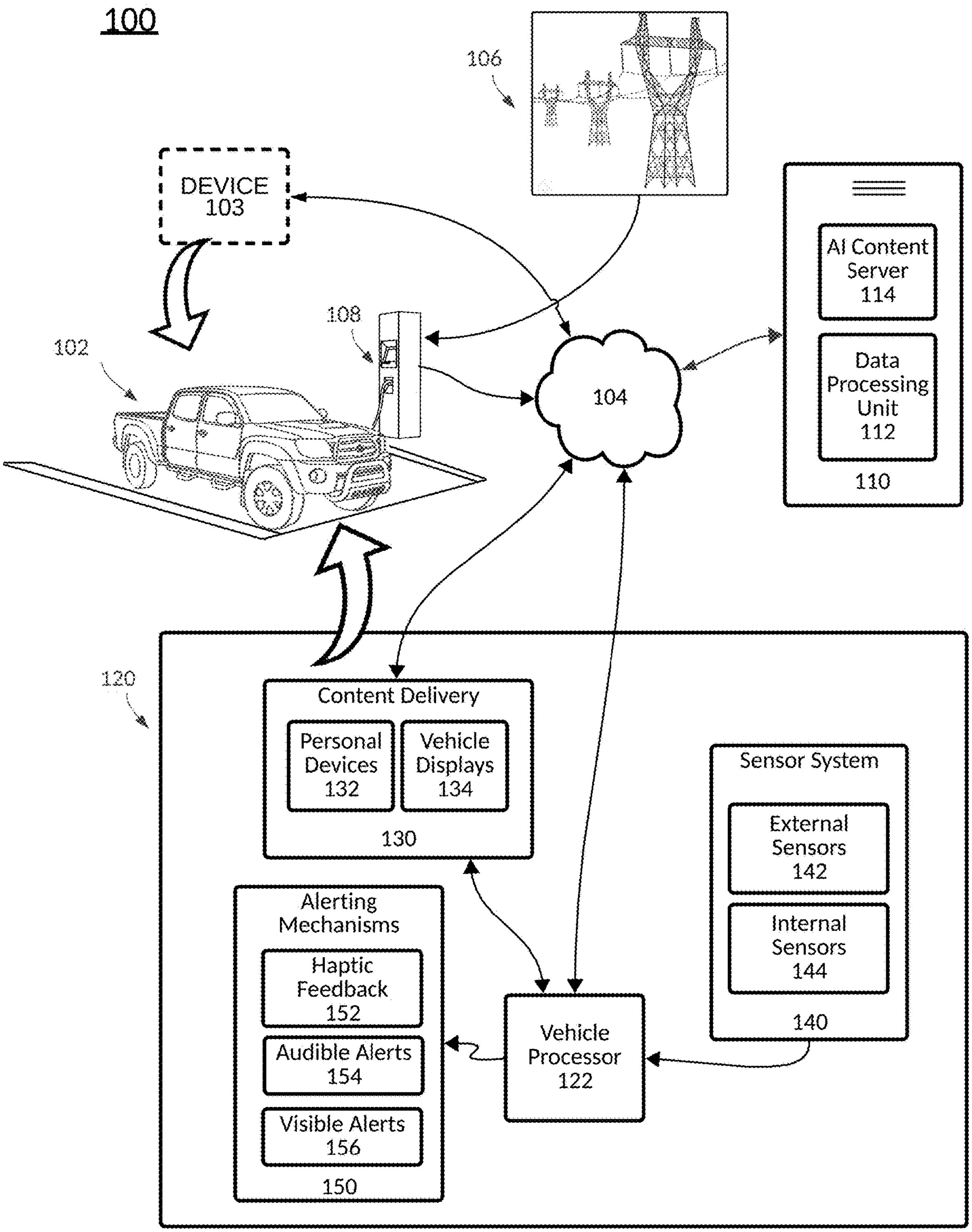
FIG. 1A illustrates an example network diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable medium or a non-transitory computer readable storage medium.

Communications between the vehicle(s) and certain entities, such as remote servers, other vehicles and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases “example embodiments,” “some embodiments,”, “a first embodiment”, or other similar language throughout this specification refers to the fact that a particular feature, structure, or characteristic described in connection with the one or more embodiments may be included in one or more other embodiments described or depicted herein. Thus, the one or more embodiments, described or depicted throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner, by example only, or more feature(s), element(s), and step(s) described herein may be utilized together and in various combinations, without exclusivity, unless expressly indicated otherwise herein. In the figures, any connection between elements can permit one-way and/or two-way communication, even if the depicted connection is a one-way or two-way connection, such as an arrow.

In the instant solution, a vehicle may include one or more of cars, trucks, Internal Combustion Engine (ICE) vehicles, battery electric vehicle (BEV), fuel cell vehicles, any vehicle utilizing renewable sources, hybrid vehicles, e-Palettes, buses, motorcycles, scooters, bicycles, boats, recreational vehicles, planes, drones, Unmanned Aerial Vehicle (UAV) and any object that may be used to transport people and/or goods from one location to another.

In addition, while the term “message” may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable medium, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve crypto-currencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are “endorsed” before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A “node” may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries, and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach may not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors, and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle, and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data, and it also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

The instant solution pertains to an Artificial Intelligence (AI) system designed to determine the characteristics of content delivered to a vehicle when connected to a charging station. For example, an EV arrives at a charging station to charge its battery from 20% to 80%. The EV is a mid-range EV with a battery capacity of 60 kilowatt hour (kWh), capable of charging at a 50 kilowatt (kW) rate at a fast-charging station. The total energy needed to charge the battery from 20% to 80% is 60% of 60 kWh, which amounts to 36 kWh. Under normal circumstances, without any additional power consumption, this charging process may take approximately 43 minutes (0.72 hours), calculated by dividing the required energy (36 kWh) by the charging rate (50 kW).

When the vehicle's infotainment system is utilized to consume content (e.g., watch videos or play games) while charging, the infotainment system, including its screen and other electronics for media playback, consumes about 100 watts (0.1 kW). If the system is used for the entire duration of the charging process (43 minutes or 0.72 hours), it will consume additional energy. The energy consumption of the infotainment system for this period is calculated as 0.1 kW multiplied by 0.72 hours, resulting in 0.072 kWh. To understand the impact of this additional consumption on the charging time, we need to consider the efficiency of the EV's charging process. Assuming the charging efficiency is 90%, the charger needs to supply more energy than the infotainment system consumes to compensate for the loss in efficiency. Therefore, the additional energy required from the charger is about 0.08 kWh (calculated by dividing 0.072 kWh by 0.9). This extra energy may add approximately 6 seconds to the charging time, calculated by dividing 0.08 kWh by the 50-kW charging rate.

Referring to FIG. 1A, an EV capable of being charged at a plurality of charging stations is routed (or routes itself) to one of a plurality of charging stations. The EV is connected (physically or wirelessly) to an available charging station. The charging station might be a stationary apparatus affixed to a curb, a low-profile pad, or an upright structure. In other situations, the charging station might be an extensive infrastructure of roadways capable of charging a non-stationary EV traveling on the roadway. After the EV is connected physically or wirelessly to the charging station apparatus, the instant solution initiates protocols to authenticate and authorize the vehicle operator before charging the EV.

FIG. 1A illustrates a network diagram 100, according to example embodiments. An electric vehicle (EV) 102 is the central component of the network. The EV is at least equipped with an infotainment system, a charging interface for connecting to a charging point 108, and communication modules for data exchange (e.g., Bluetooth, Wi-Fi). A charging station 108 is depicted as a charging point but may include many charging points at many charging bays. The charging point 108 interacts with the EV to provide the necessary power for charging. It communicates with the EV to convey charging parameters like power output, expected duration, and charging status. A device 103 may be associated with an occupant of vehicle 102 and may be present with the occupant. The device may be a smartphone and/or wearables (like smartwatches). These devices carry the profile data of the occupant, including content preferences. They connect to the EV's system via wireless communication protocols like Bluetooth. An AI content server 114 may host the AI model and content library. It may execute in server 110 and receive profile data and charging duration information to determine suitable content.

Server 110 may include one or more computers communicatively coupled to vehicle 102. Server 110 may include one or more processors and memory devices for storing applications and data. In one embodiment, server 110 may be associated with a vehicle manufacturer, including a repair facility, a sales facility, an entertainment establishment, and the like. In one embodiment, server 110 may be in a network or cloud 104 and/or connected to a vehicle charging station 108. The server 110 may be cloud-based or located within the EV's network. The data processing unit 112 may be in the server 110. It processes the charging duration data from the charging station and profile data from the occupant's devices. It interacts with the AI content server to facilitate content selection. In an alternate embodiment, server 110, AI content server 114, and data processing unit 112 may be located in EV 102 or outside the EV. It may communicate with the EV through the network 104.

The AI content server 114 is a central component of the system that performs several key functions and interacts with multiple parts of the network. Its primary role is to manage content selection, customization, and delivery to the EV's 102 occupants based on various factors, including user preferences and charging duration. The AI content server is responsible for hosting or accessing a content library and selecting content that aligns with the occupants' profiles. The server uses machine learning to analyze historical and real-time data to understand individual preferences and suggest the most appealing content to the occupants. This may include various media such as videos, music, games, or educational materials. The AI content server 114 maintains a database of user profiles, which may include information such as past content consumption, preferred genres, and other personalized settings. It uses this data to tailor the content delivery to each occupant's preferences. In one embodiment, the profiles can be updated based on the occupants' interactions with the content. For example, as the EV 102 approaches charging station 108, the AI content server receives real-time data from EV 102 and the occupants' devices 103, such as smartphones or wearables. This data may include the vehicle's estimated charging time and the occupants' current state, which may be inferred from data points like heart rate or activity levels detected by wearable devices.

The AI content server 114 may interact with charging station 108 to understand the expected charging duration and optimize content length accordingly. It ensures that the content delivery is synchronized with the charging process, attempting to complete the content delivery by the time charging is finished. Considering the device capabilities within the EV (such as screen resolution and sound system quality), the server selects the optimal device for content delivery. It ensures that content is appropriately formatted for each device and manages the simultaneous streaming of different content to various occupants if needed. For example, vehicle 102 may send to server 110 details of the media equipment, such as the processor, display limitations, number of displays, locations, sound capabilities, etc. This may be sent in response to a query by the server 110, for example.

In one embodiment, the AI content server 114 may also serve as a feedback loop in the system. It may collect data on content engagement and charging patterns to continually refine its algorithms and improve content recommendations and delivery methods. This feedback may be communicated with server 110 from vehicle 102, wherein the communication may be routed through network 104. The AI content server 114 may communicate with external servers through network 104, such as cloud services or databases that provide additional content or services. It may also interact with servers responsible for managing the charging infrastructure to coordinate energy supply with content delivery. In one embodiment, the server 110 implements security measures to protect the data it processes and stores. This may include encrypting data transmissions and adhering to privacy regulations to safeguard personal information.

The data processing unit 112 aggregates and manages data from various sources, including vehicle-specific information like battery status, occupant data from personal devices and in-vehicle sensors, and external inputs such as charging station 108 characteristics and network information. This unit is integrated with the AI content server, supplying essential data to facilitate informed content selection decisions. This integration allows the delivered content to be customized to the occupants' preferences and synchronized with the charging duration. The system adapts content delivery dynamically, responding to changes in estimated charging time or alterations in the occupants' preferences and status, which may be detected through wearable devices or interactions within the vehicle. The unit is adept at analyzing occupant behavior and preferences based on historical data, enabling it to predict their most engaging content types during the charging period.

The data processing unit 112 integrates with the vehicle's various systems, such as the infotainment system, battery management system, and onboard sensors, to ensure that content delivery is compatible with the vehicle's technical capabilities and conforms to operational constraints. The unit maintains communication with the charging infrastructure, gathering specific information about the charging session, including the rate of charging, expected duration, and any unique features of the charging station that may influence content delivery. In one embodiment, the data processing unit 112 acts as a feedback loop within the system, collecting data on user engagement, the effectiveness of content delivery, and charging patterns. This feedback is used to refine the AI functionality, leading to continuous improvements in content recommendation and delivery methods.

The charging point 108 is a piece of infrastructure that may provide a role beyond simply supplying power to the vehicle. Its functionality may extend into communication and interaction with vehicle 102 and AI content server 114 to provide a seamless and enhanced charging experience. The charging point is depicted as the hardware that connects to the vehicle through a charging port. It may be part of a group of charging points at a location referred to as a charging station (not depicted). The charging point 108 is equipped to deliver electrical power from grid 106 to EV 102, which may involve facilitating a range of charging capabilities to accommodate different EV models with varying charging rates and battery capacities. The charging point 108 is designed to connect with the vehicle physically through a plug-in mechanism or wirelessly, depending on the technology implemented. The charging point 108 may be embedded with sensors and communication modules that allow it to transmit data regarding the charging process to the vehicle and/or a server, such as the AI content server 114. This data may include the current power output, the expected duration of the charging session, the status of the charging process, etc. Such information is needed for the AI content server 114 to align the content duration with the charging time. Charging point 108 may also play a role in the vehicle's and its occupants' authentication and authorization. It may engage in a secure exchange of information to confirm that the vehicle is authorized to use the charging services and that any billing or service subscriptions are valid and current. The charging point 108 or charging station can be part of a broader network that communicates with energy providers and grid systems 106, managing the demand and supply of electricity more efficiently. This may involve smart grid integration, where the station participates in energy management strategies to optimize charging times based on grid load, renewable energy availability, and electricity pricing.

The EV 102 may include components 120, such as a vehicle processor 122, devices for content delivery 130, alerting mechanisms 150, and a sensor system 140. The vehicle processor 122 may be connected to all components and to network 104 for communication with computers and/or servers external to EV 102. The content delivery components 130 may communicate with network 104, such as when the personal devices 132 communicate data to a cellular network (3G, 4G, 5G), Wi-Fi, dedicated short-range communication (DSRC)/Vehicle to Everything (V2X), etc. The personal devices may include mobile devices, tablets, laptops, wearable devices, etc. Vehicle displays 134 may be one or more displays used to present and receive data and may communicate with another processor, such as a processor associated with the infotainment system, the head unit, and/or the vehicle processor. The displays may be in the head unit and/or other locations in the cabin of the EV, such as in the rear portion of the cabin and/or on seat backs. The system may utilize alerting mechanisms 150 to notify occupants in the EV and may include haptic feedback 152, such as vibrating devices in the steering wheel, seats, etc. Audible alerts 154 may include sounds played through the audio system and may be used to bring attention to a received message. Visible alerts 156 may include lights or messages displayed on the vehicle displays 134. The sensor system 140 may include external sensors 142 and internal sensors 144. The system may use the sensors to obtain media such as images or video from cameras on the vehicle, audio from microphones on the vehicle, object detection from radar/lidar devices, etc.

The instant solution encompasses a system that integrates sensors with an AI model. These sensors are strategically coupled to various devices, including personal devices 132, such as smartphones, wearables like smartwatches, and vehicles. This configuration allows the system to receive and process data from these devices, enhancing the AI model's capabilities. The system is designed to facilitate seamless connectivity between wearable devices and vehicles with the AI model. This includes the ability of a smartwatch to interact with the AI model, where signals are transmitted to the AI content server 114, which may be located within the vehicle or externally.

Incorporating data from a wearable watch into the AI model starts with establishing a connection between the watch and the vehicle's system, such as through a wireless connection (e.g., Bluetooth or Wi-Fi). The data transferred may include a range of personal information such as the wearer's heart rate, activity levels, and preferences, like favorite music or news subjects. The AI model uses this data to identify the occupant. This identification can be achieved by linking unique profiles to each wearable device. The AI model processes this contextual data to understand and respond to the occupant's current needs or state. For example, if the watch indicates elevated stress levels, the AI model might select calming music or suggest a soothing video. The AI model integrates this personal data with the vehicle's other systems. For example, if the wearable indicates prolonged activity, the AI model might suggest taking a break or adjusting the vehicle's climate control for increased comfort. The watch may act as a feedback device, allowing the occupant to adjust preferences or control the content delivered by the AI model, such as pausing or changing it. Sensitive and/or security measures include encrypted data transmissions and adherence to privacy regulations.

In one embodiment, the system determines the type of vehicle, whether it is an internal combustion engine (ICE), hybrid, or EV. This determination is crucial, particularly when the vehicle approaches a fueling station, whether a gas station or an EV charging station. The system intelligently identifies if the vehicle is turning into these stations and whether such a location is a predefined destination in the vehicle's navigation system.

Upon entering a fueling or charging station, the system ascertains the vehicle's specific characteristics and prepares content tailored to the vehicle and its occupants. This content preparation involves determining the occupants' identities, the type of content suitable for them, the preferred delivery medium (vehicle displays 134 of the infotainment system or personal devices 132), and the necessary adjustments in settings, such as volume or noise cancellation.

The system exhibits an advanced understanding of the vehicle's and occupants' statuses. For example, when a vehicle halts at a location, it gathers all the relevant information beforehand. If an occupant exits the vehicle to initiate refueling or charging, the system automatically pauses the content delivery if intended for the exited individual. Conversely, if the content is meant for remaining passengers or the exited individual continues engaging with it on a mobile device, the system adapts accordingly. It also intelligently prompts safety notifications like "Check surroundings" when an occupant might be distracted by their mobile device upon exiting a busy area.

The instant solution accounts for the dynamic nature of such scenarios. It anticipates an individual's duration outside the vehicle based on average times associated with specific charging or refueling processes. Accordingly, it curates content of appropriate length (for example, 30-40 seconds) for passengers remaining in the vehicle. This content is selected based on the passenger's preferences or prior selections by the driver. The system can track the driver's movements, such as entering a store, and adjust the content duration based on the estimated return time. When the driver's return is delayed beyond the anticipated time, the system transitions to alternative content forms like music or news snippets, which can be conveniently interrupted upon the driver's return.

In one embodiment, at least one occupant in the vehicle is monitored by the vehicle when the content is consumed, and the system modifies the content and/or the delivered content based on the monitoring. In one embodiment, the system formats content consumed in the vehicle before downloading the content. This formatting may be due to the device on which the content will be consumed, the occupant that will be consuming the content, and/or the display on which the content will be presented. In one embodiment, content is determined for vehicle delivery when the vehicle is proximate to the charging location. As the system determines that the vehicle is approaching the charging location (such as via sensors or communication with a navigation server), content is determined for the vehicle and queued up for delivery to the vehicle. When the vehicle connects to the charging point, the content is immediately delivered to the vehicle. The content may be split-streamed to multiple devices, and in one embodiment, the content is split before the vehicle is connected. In another embodiment, the content may be delivered to the non-driver before arriving at the connection point and delivered to one or more of a device associated with the driver and/or a display proximate to the driver when the vehicle connects to the charging point.

This instant solution advances the integration of AI and machine learning technologies with vehicle charging systems. This system can deliver personalized, relevant, and timely content to vehicle occupants by analyzing user profiles and vehicle capabilities and employing machine learning models. Such a system can enhance the user experience during charging times, typically considered downtime.

The AI model focuses on content personalization, offering tailored content to the vehicle's occupants based on their preferences, vehicle models, and device capabilities. This includes selecting the type of content (such as entertainment, news, or vehicle updates), optimizing its format for the specific in-vehicle devices, and aligning the content's length with the charging duration. Additionally, the AI model assists in vehicle charging management. It assists in efficiently routing the EV to the most appropriate charging station, considering factors like location, availability, and charging speed. The AI model also manages the charging process, ensuring energy is delivered efficiently and safely to the vehicle.

The AI model offers interactive services like maintenance scheduling and real-time updates and integrates with the user's smart devices, thus extending its functionalities beyond the vehicle. The AI model learns and adapts to user preferences over time, continually refining its content recommendations and services.

Using an AI model, content delivery, duration, and the choice of device during EV charging are determined, involving user profile analysis, contextual data interpretation, and device capability assessment. The AI model scrutinizes user-profiles and encompasses past preferences and consumption patterns to predict the type of content the user might find engaging. This functionality also considers contextual factors like the time of day, location, and the user's schedule to suggest the most relevant content. Additionally, the AI model adapts its real-time suggestions based on user interactions with different content types. The AI model estimates the charging time for content length optimization, considering variables like battery level and charger type, and aligns the content duration accordingly. It also tracks user engagement metrics, such as average watch or listen time, to tailor the content length to individual preferences. Regarding device selection, the AI model evaluates the capabilities of available devices within the vehicle, such as screen resolution and sound quality, and analyzes user habits to determine the most suitable device for content delivery. It also ensures seamless integration and content transition between devices, adapting to the user's activities and needs.

Figure 1B:
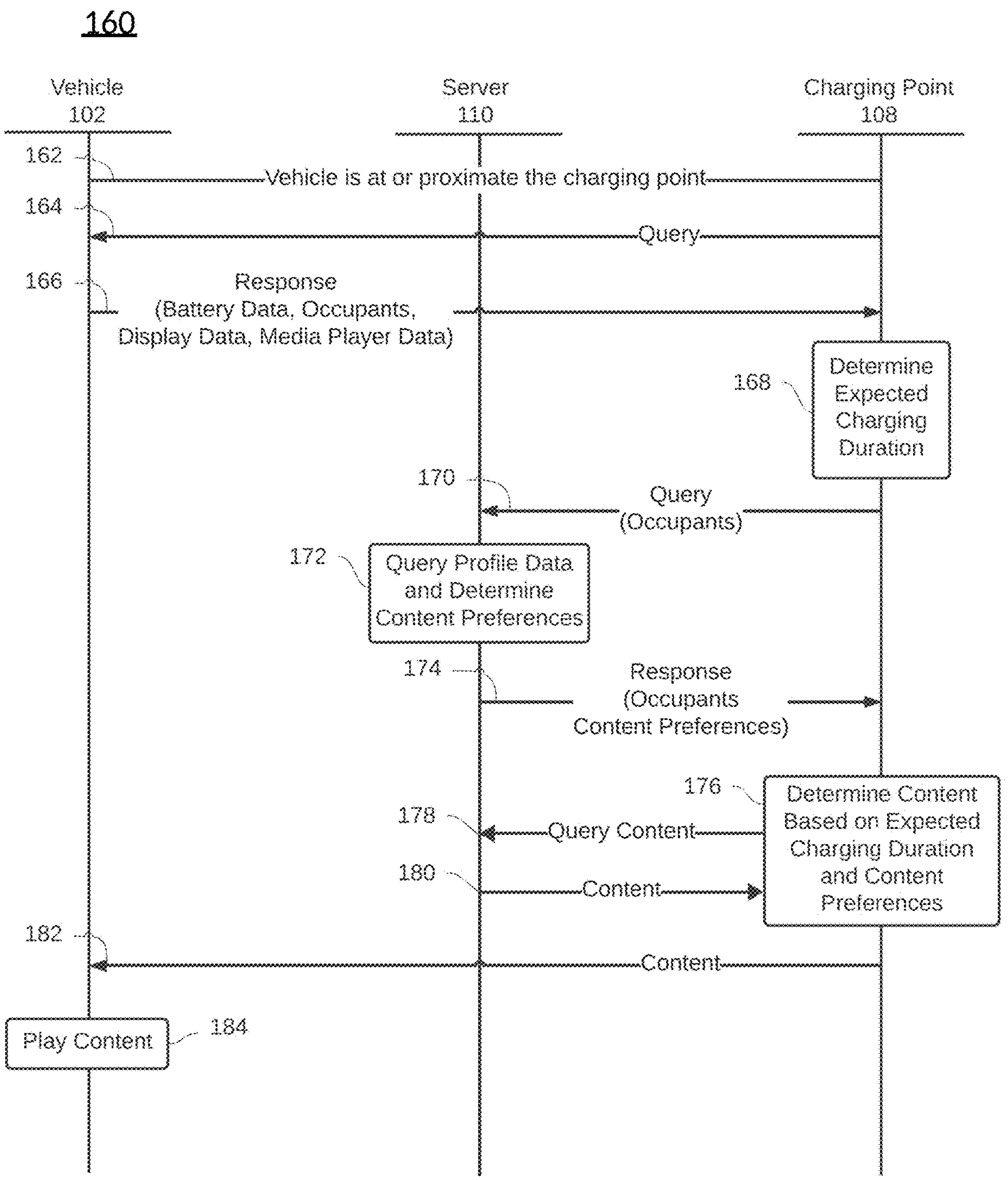
FIG. 1B illustrates a message flow, according to example embodiments.

According to example embodiments, FIG. 1B illustrates a message flow diagram 160 of delivering content while charging. The flow begins 162 with vehicle 102 being at or proximate to charging point 108. A query message 164 is sent to the vehicle from charging point 108. This message may be sent from any charging point, the charging station, and/or a server/computer associated with the charging point and/or charging station. The query message 164 is received at the vehicle and may be processed by a processor in the vehicle, such as the vehicle processor (the main processor in the vehicle). The vehicle collects and transmits information to the charging station, including data on battery status, media preferences, and display capabilities, ensuring the delivery of personalized and optimized content to the vehicle during the charging session. The EV is equipped with a sophisticated battery management system (BMS) that constantly monitors the battery's status. This includes data on the current charge level, battery health, capacity, and estimated charging time required to reach a specific charge level. The BMS can also calculate the optimal charging rate based on the battery's condition and the characteristics of the charging station. The vehicle's infotainment system records the occupants' media consumption patterns. This may include previously played audio or video files, preferred genres, volume settings, and user interactions with the system. The infotainment system might also collect data on the occupant's content preferences from linked personal devices 132 (like smartphones or tablets) through wireless connections such as Bluetooth or Wi-Fi.

Vehicles 102 often have multiple display units with varying capabilities (like screen resolution, size, and interactive features). The vehicle's system can collect data on these display characteristics, including which screens are most frequently used for media playback and any specific settings or preferences associated with these displays. Upon arriving at charging point 108, the vehicle 102 connects with the charging infrastructure. This may be a physical connection (through a charging cable) or a wireless connection for data transfer. The vehicle's system then transmits the collected data to the charging point in a response 166. This transmission can occur over standard vehicle communication protocols like CAN (Controller Area Network) for wired connections or wireless protocols like Wi-Fi or cellular networks. The data sent may include battery information (like current charge level and required charging time), media preferences (including types of content consumed and user preferences), and display capabilities (such as screen resolution and size). Upon receiving this data, the charging point processes it, potentially in conjunction with an AI content server 114. The AI content server uses this information to determine the most appropriate content for the vehicle occupants during the charging session. The content determination process involves considering the expected charging duration 168 (based on battery data), the types of media preferred (from media data), and the optimal format for the available displays in the vehicle (using display data).

Data collection from personal devices like smartphones and wearables, such as smartwatches, may be stored. Once connected to the vehicle's system via Bluetooth or Wi-Fi, these devices transfer user-specific profile data, including media preferences and biometric data. Modern vehicles are also equipped with various sensors and cameras that detect the presence and number of occupants. These include seat occupancy sensors and interior cameras, potentially equipped with facial recognition software, enabling the system to identify occupants by comparing the captured images with a database of known profiles. Individual profiles may be stored for occupants of vehicle 102, wherein settings and preferences are stored. This data may be stored locally in the vehicle or on a server 110 outside. When an occupant interacts with the vehicle's system, the vehicle can deduce the occupant's identity based on these interactions, such as adjustments to the seat or infotainment system. The system may also recognize which user profile is active, indicated by the connected smartphone or the key fob used.

The system may utilize machine learning functionality that analyzes behavioral patterns like content preferences, adjustments of vehicle settings, and driving styles. Over time, this functionality enhances their accuracy in associating these patterns with specific occupants. Wearable technology may also contribute data, providing health metrics and activity levels unique to each occupant, aiding in their identification. Voice recognition technology is another key component, identifying occupants based on their voice patterns during interactions with the vehicle's voice assistant. The occupant data may be returned from vehicle 102 to charging point 108 in response message 166. The charging point 108 queries 170 the server 110, sending the received occupant data from the vehicle. The server may query 172 the previously stored profile data to determine the content preferences of each of the occupants, wherein the determined content preferences are returned to the charging point 108 in the response message 174.

The AI system may also consider additional factors such as the time of day, weather conditions, and even current news or events to enhance the relevance and appeal of the content offered. Once the content is selected, it is delivered back to the vehicle, either through the same communication channel used for data transmission or through an alternate medium if more appropriate (like streaming directly to the occupant's devices). The vehicle's infotainment system receives this content and adjusts playback according to the previously collected display and user preference data, ensuring an optimal viewing or listening experience.

The charging point 108, querying 178 the server 110 (utilizing one or more of the AI content server 114 and the data processing unit 112), determines the content 180 to be delivered to the vehicle based on the expected charging duration and the content preferences 176. It delivers the content 182 to the vehicle, where it is played 184.

The AI content server 114 selects content from its library that aligns with the occupants' preferences and the estimated charging time. This selection is based on machine learning functionality that analyzes factors such as past consumption patterns, real-time interactions, and contextual data like time of day or location. The server 110 ensures that the content is suitably formatted for in-vehicle delivery, considering the capabilities of the vehicle's display and sound systems. Once the content is selected and optimized, it is delivered 182 to the vehicle. This delivery can occur through the same communication channel used for the initial data exchange or via an alternate method, such as streaming directly to occupants' devices within the vehicle. The vehicle's infotainment system, interconnected with various in-vehicle displays and audio systems, receives this content. In one embodiment, the infotainment system then adapts the playback of the content according to the collected display capabilities and user preferences to ensure that the viewing or listening experience is optimized for each occupant. The content delivery is synchronized with the charging process to complete the content delivery by the time the charging is finished. In one embodiment, the system may also include a feedback mechanism, where the AI content server 114 receives data on content engagement and charging patterns. This feedback is used to refine the functionality, improving future content recommendations and delivery methods.

In one embodiment, the instant solution tracks the consumption of content, such as the progress of a movie, and aligns the remaining content with the duration of the charging cycle. If the charging time is shorter than the remaining content, the system suggests alternatives or saves the user's place for later viewing. The system recognizes the composition of the vehicle's occupants and adjusts content offerings accordingly. For example, if the presence of children or individuals with content sensitivities is detected, the system will filter out unsuitable content, ensuring that the ambiance remains appropriate for all. In cases where an occupant leaves the vehicle temporarily, the system pauses their specific content or provides alternative entertainment to the remaining passengers, resuming or re-adjusting once the occupant returns.

Furthermore, the AI model considers each occupant's content preferences and restrictions, possibly stored on personal devices, to deliver a comfortable and customized experience. The AI model also manages the delivery of different content streams to individual devices within the vehicle, allowing each passenger to engage with their chosen media without infringing on others' experiences. Over time, the AI system may learn from each content delivery event, enhancing its predictive capabilities to match future recommendations to occupant preferences better. This includes understanding subtle preferences like favored directors or movie themes, thereby continually improving the relevance and satisfaction of its content curation.

The system gathers data from a device associated with the occupant, such as a smartphone, a tablet, or a wearable device. This data gathering may be via wireless communications between the vehicle and/or an external server and the device. This data encompasses various dimensions of the occupant's interactions with content, such as historical content viewing times and lengths, which provide insights into when and how long the occupant typically engages with different media types. The system may analyze interactive content responses, capturing how the occupant interacts with content that requires input, such as choices in an interactive story or responses to prompts within an educational program. This interactive data helps the system understand the occupant's engagement level and preferences regarding interactive media. The occupant's content download preferences are also considered, revealing the types of content they prefer on their device, which may indicate a preference for offline viewing or specific genres and formats they enjoy more frequently.

The system also considers past content that has been delivered to the EV, as well as content that has been delivered to one or more devices associated with the occupant outside of the EV, allowing the AI model to create a continuity of experience, offering content that not only matches the occupant's current mood or preference but also creates a seamless transition from their previous interactions with media outside the vehicle. Whether the occupant was watching a news series on their tablet or listening to a podcast on their smartphone, the system intelligently proposes to continue or complement these experiences during the charging period.

In one embodiment, an urgency parameter is a pivotal element that determines the order and precedence of content delivery based on its relevance to each occupant. In this context, relevance is quantified and assessed against a predefined threshold unique for each occupant. If the relevance of the content to an occupant's preferences and historical patterns crosses this threshold, the content is considered urgent and is prioritized for delivery.

In a scenario involving multiple occupants, the system's decision-making process accounts for the collective preferences of all passengers. If, for example, two occupants strongly prefer a particular type of content, which is consistent with their past behavior, the urgency parameter for that type increases cumulatively based on their combined interest. Consequently, if the combined urgency of these two occupants for a specific content type surpasses the individual urgency parameter of a third occupant, the system adjusts its prioritization, shifting the content delivery focus to align with the majority interest. This dynamic prioritization approach ensures an equitable and democratic distribution of content, where the 'winning' content—that which is most relevant to the majority of occupants—is delivered. In practice, this may mean that if two of the three occupants prefer to engage with a particular series or genre they have commonly enjoyed, the system will recognize this shared preference as a higher priority over the content desired by the third occupant.

In one embodiment, the system utilizes a synchronization process to ensure the commencement of content delivery to all occupants at once. This synchronization is crucial as it marks the beginning of the personalized entertainment experience for each occupant, timed perfectly with the initiation of the charging process. To achieve this personalized content delivery, the system relies on the profile data of each occupant within the EV. This profile data is a comprehensive compilation of individual preferences, historical content interactions, and other relevant personal information that the AI model uses to tailor the content. The profile data may be stored on the vehicle and/or in a remote server. The content differentiation process involves deeply analyzing this profile data to determine what type of content aligns with each occupant's tastes and prior content consumption patterns. When the profiles are analyzed and the content is selected, the system dispatches the content to each occupant's respective in-vehicle device or personal device 132 connected to the infotainment system. This process is orchestrated so that despite the content being diverse and customized for each occupant, the delivery is unified in its initiation. When the EV is connected to the charging point, and the system acknowledges this connection, each occupant's selected content streams begin concurrently. This ensures that no one is left waiting and that the charging time is utilized efficiently from the very start for an enhanced, individualized in-vehicle experience.

In one embodiment, the instant solution utilizes each occupant's presence and expected duration of stay. The system's first step involves determining whether an occupant is inside the EV. This is achieved through an array of sensors and inputs, such as seat occupancy sensors, connected personal devices, and even biometric data from wearables, which communicate with the vehicle's system to confirm the presence of occupants.

Once the presence is ascertained, the system estimates when each occupant will likely remain in the EV. This estimation is based on a range of factors, including the occupant's behavior patterns, such as the usual stay duration in the vehicle during past charging sessions and the vehicle's charging time itself. The system may also factor in the occupant's schedule, which may be synced from personal devices to the vehicle's AI model to predict their length of stay more accurately.

Combining the data about the occupant's presence and the estimated duration of their stay, the system then curates a content experience that is not only tailored to the occupant's preferences but also fits within their expected time in the vehicle.

In one embodiment, the instant solution determines the presence of one or more occupants within the EV via seat sensors and the connectivity status of personal devices 132 to verify whether additional occupants are onboard. The system compares the content preferences among the occupants. This involves analyzing the profile data of each occupant, which may include historical content choices, frequently viewed genres and other personalized settings stored within the vehicle's infotainment system on the occupants' devices and/or in a remote server. When the system identifies a commonality in content preferences, it can optimize the content delivery to cater to these shared interests. This may mean streaming a universally appreciated genre of music or selecting a video that aligns with the collective taste of the group. In contrast, if preferences diverge, the system can deliver multiple streams of differentiated content, ensuring that each occupant receives a content experience personalized to their preferences while considering the group dynamic.

In one embodiment, the system assesses the content preferences for similarities upon determining the occupants' presence in the vehicle. If the preferences are similar across occupants, the system delivers content that resonates with the collective taste, creating a shared entertainment experience. Conversely, should the system identify distinct differences in content preferences, indicating a lack of commonality among the occupants, it activates an alternative protocol. The system delivers alternative content tailored to each occupant's preferences in this scenario. This content diversification is facilitated by the vehicle's multi-channel delivery capability, which allows for simultaneous streaming of different content types across various in-vehicle devices or personal devices connected to the system.

Occupants may not always remain inside the vehicle during the charging process. Recognizing the need for flexibility, the instant solution is equipped to cater to occupants who might step out for various reasons, such as to eat, use the restroom, or take a break from the confines of the vehicle. During such instances, the system maintains the continuity of content delivery by transitioning the content stream to the occupants' mobile devices 132. This allows them to continue engaging with the content without interruption, irrespective of their physical location relative to the EV. The system's design ensures occupants can seamlessly receive content on their devices, including smartphones, tablets, or laptops, linked through the vehicle's infotainment network and/or an external server. This feature is particularly significant in enhancing the charging experience by allowing occupants to move around without missing out on entertainment or information. It reflects a key aspect of the system's user-centric approach, providing a versatile and uninterrupted content delivery service that adapts to the changing situations of the occupants.

Occupants may not be present in the charging vehicle. Should the EV be devoid of occupants, the system engages its location-aware capabilities to ascertain the whereabouts of the occupant(s) and predict when they are likely to return to the vehicle. In such instances, the vehicle suspends content delivery within its confines, following the principle that the content should follow the occupant. To determine the occupant's location, the system utilizes a combination of onboard cameras, which can detect the presence or absence of individuals within the vehicle, and the geolocation data from the occupant's mobile device. This geolocation capability allows the system to monitor the distance of the occupant from the EV and estimate the time it may take for them to return based on their current trajectory and speed of movement. Sensor or video feed data from the charging location may be interacted with, offering supplementary information about the occupant's activities. For example, if the data indicates that the mobile device has remained stationary, the system may infer that the occupant is engaged in a stationary activity, such as dining or working, and adjust the expected return time accordingly. This awareness allows the system to optimize content delivery timings, ensuring that the EV does not play content to an empty audience. Instead, it prepares to resume content delivery to coincide with the occupant's return or continues to provide content to the occupant's mobile device if they prefer to continue their consumption away from the EV.

The instant solution may adjust the expected charging duration. This adjustment is based on several external and performance-related factors, ensuring that the time allocated for content consumption aligns with the actual charging time. The system considers the ambient temperature at the location of the EV. Temperature can significantly impact battery performance and, consequently, the charging process. For instance, extremely cold or hot conditions can affect the rate at which the EV's battery accepts charge, potentially prolonging the charging duration. The system continuously monitors these temperature conditions and adjusts the expected charging time accordingly. In addition to temperature, the system considers the current demand on the energy provider. During peak times, when there is a high electricity demand, the charging process might be slower due to constraints on the power grid or managed charging protocols implemented by energy providers. The system remains aware of these demand fluctuations and modifies the estimated charging time to reflect any potential delays or accelerations in the charging process. The system evaluates performance metrics associated with the charging point itself. These metrics may include the charging point's current efficiency, historical performance data, and any maintenance or operational issues impacting its functionality. By analyzing these metrics, the system can predict any variations in the charging rate that might arise from the charging point's condition or capability.

In one embodiment, the instant solution analyzes aspects of the EV's charging history and environmental factors to optimize its functionality. The system analyzes historical charging patterns, including data on how the EV has been charged at different points. This analysis covers aspects such as the duration of charging sessions, the rate of energy consumption, and the types of charging points used (e.g., slow charger vs. fast charger). By understanding these historical patterns, the system predicts the vehicle's charging behavior and needs more accurately. The system monitors the energy consumption rate while the vehicle is connected to a charging point. This involves assessing how quickly the battery is charging at that specific moment and how this rate might vary under different conditions or at different charging stations. This real-time monitoring allows the system to adjust its expectations and plans for the duration of the charging session. The system considers historical patterns of charging at similar charging points. If the vehicle has previously been charged at a particular type of charging station (like a fast charger), the system uses this data to anticipate the likely duration and efficiency of the current charging session if it's at a similar station. External temperature is considered. Since battery performance and charging efficiency can be significantly impacted by temperature, the system evaluates external temperature data, both historically and in real-time, to adjust its charging strategy. This ensures that the charging process is optimized for the current environmental conditions, potentially reducing charging time in favorable conditions or accounting for extended time when temperatures are extreme.

In one embodiment, the system incorporates an augmented reality (AR) platform to engage EV users during a charging session. The system is equipped with advanced AR technology. This includes high-resolution cameras, spatial sensors, and AR projectors installed around the charging stations. Users can interact with the AR environment through their smartphones or AR glasses provided at the hub. The system hosts a variety of AR experiences, ranging from virtual tours to interactive games. When an EV is plugged in for charging, the system calculates the expected charging time based on factors like the battery's current state, the charger's capacity, and historical charging data. Simultaneously, the system prompts the user to select preferred types of AR content through an interface on the EV's infotainment system or a mobile app. The AR experiences are designed to match the length of the charging session. The system offers quick and engaging experiences for shorter sessions, like a virtual tour of a nearby landmark or an AR-enhanced exploration of local flora and fauna. For longer sessions, more elaborate options are available, such as an immersive historical documentary of the area, interactive educational content, or extended gameplay experiences in a virtual world. Users interact with the AR content using hand gestures, voice commands, or through their mobile devices. The AR system is designed to be intuitive and user-friendly, ensuring that even first-time users can easily navigate and enjoy the experience. For example, in a virtual tour, users can point at an object to receive more information, or in a game, they can use hand gestures to control their avatar. The AR experiences are designed to be safe and non-intrusive. The system ensures that the AR content is confined to the user's immediate surroundings and does not distract other users at the charging station. Privacy is also a key consideration; the system is designed to avoid capturing or storing personal data without consent. The AR charging hub can be powered by renewable energy sources, aligning with the environmentally friendly ethos of EVs. The system includes multi-lingual support, content updates based on cultural and geographical contexts, and integration with local tourism initiatives to offer hyper-local experiences.

In one embodiment, the system provides personalized educational modules and skill development during an EV's predicted charging time. The system leverages the charging duration by offering tailored educational content, transforming the charging period into an opportunity for learning and personal development. The system includes a sophisticated learning management system (LMS) integrated with the EV's infotainment system and the charging station's network. The LMS hosts various educational modules covering multiple subjects and skills suitable for different age groups and learning levels. Upon first use, occupants are prompted to create a learning profile via the vehicle's infotainment system or a connected mobile application. The profile includes information about their educational interests, preferred learning styles (e.g., visual, auditory, interactive), and current knowledge levels in various subjects. The system uses AI algorithms to analyze these profiles, helping to curate personalized learning paths for each user. The system dynamically aligns the length and complexity of the learning modules with the estimated charging time. For shorter charging sessions, it might offer concise, focused lessons or quick quizzes. Longer sessions may unlock more in-depth modules, like a full chapter study or an extended skill-building activity. The content is designed to conclude or reach a logical pausing point when charging is complete, ensuring a seamless learning experience. The learning modules are engaging and interactive, incorporating multimedia elements such as videos, animations, interactive simulations, and quizzes. For instance, a module on astronomy might include a virtual telescope experience, while a language lesson may feature conversational practice with AI-powered characters. The system tracks the user's progress, providing feedback and adapting future content suggestions based on performance and engagement levels, ensuring that the difficulty and topics of the modules evolve with the user's growing proficiency. The system can synchronize with external educational platforms and resources, allowing users to continue their existing online courses or academic programs during charging sessions. The system continuously updates and expands the library of learning modules.

In one embodiment, the system implements a customized fitness program into an EV charging experience. The system suggests and streams a variety of physical activities and guided exercises that can be performed within or near the vicinity of the vehicle. The system includes a digital fitness platform integrated with the EV's infotainment system and connected to the charging station network. The platform hosts a variety of workout routines, ranging from quick stretches to more comprehensive exercise sessions, designed by fitness experts. The integration with the EV's system allows the platform to receive real-time data on the charging duration, enabling it to suggest workout routines that fit within the charging timeframe. Users create a fitness profile through the vehicle's infotainment system or a linked mobile application. The profile includes information such as fitness level, preferred types of exercises (e.g., cardio, strength training, yoga), physical limitations, and health goals. The system uses the information to personalize the workout suggestions, ensuring they are suitable and effective for each user. The system recommends a set of exercises based on the estimated charging time and the user's fitness profile. For shorter charging periods, the focus might be on quick, energizing workouts like stretches or a brief high-intensity interval training (HIIT) session. The system may suggest more involved routines for longer periods, such as a full yoga sequence or a bodyweight circuit. The workouts are designed to be engaging and accessible, with options to follow along with video demonstrations or audio instructions. These guides are streamed directly to the vehicle's infotainment display or the user's mobile device. The system can also integrate with wearable fitness devices to track performance metrics like heart rate and calories burned, providing real-time feedback. The system can also suggest outdoor exercises, considering the vicinity of the charging station. For example, the system might recommend a brisk walk or a light jog if the station is near a park or a walking trail. Users can track their progress over time, with the system recording each workout session and providing insights into their fitness journey. This tracking feature includes motivational elements, such as setting goals, earning rewards for consistency, and receiving personalized encouragement based on progress. The system offers community features, enabling users to participate in virtual fitness challenges, share achievements, and even engage in friendly competitions with other EV users at the same charging station. The platform receives regular updates with new workouts, fitness challenges, and integration with emerging fitness trends.

The role of the energy provider is crucial and multifaceted, related to the charging points for electric vehicles (EVs). In this context, the energy provider refers to the entity responsible for supplying electricity not just to the charging point itself but also to the broader area where the charging point is located, such as a city, county, or specific region. The energy provider to the charging point is directly responsible for the electricity that powers the charging stations. This provider's capacity, reliability, and efficiency directly impact the charging speed and availability at these points. The system integrated within the EV actively communicates with the charging point to gather information about the current power supply, potential disruptions, or scheduled maintenance activities that might affect the charging process. This data may be ascertained via communication with a remote server.

Beyond the immediate vicinity of the charging point, the energy provider responsible for the larger area plays a significant role in the overall energy ecosystem. For example, the electricity supply to a city or county can influence the operational efficiency of charging stations. Factors like grid stability, peak power demands, and renewable energy integration within the broader area can indirectly impact the performance of the charging points.

The system within the EV is designed to consider these broader energy supply dynamics. It can adjust its expectations and strategies for charging based on the larger energy landscape. For example, during peak demand times in a city, the system might anticipate slower charging speeds or plan for alternative charging schedules to optimize the charging process.

Flow diagrams depicted herein, such as FIG. 1B, FIG. 2C, FIG. 2D, FIG. 2E, and FIG. 2F, are separate examples but may be the same or different embodiments. Any of the operations in one flow diagram may be adopted and shared with another flow diagram. No example operation is intended to limit the subject matter of any embodiment or corresponding claim.

It is important to note that all the flow diagrams and corresponding processes derived from FIG. 1B, FIG. 2C, FIG. 2D, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
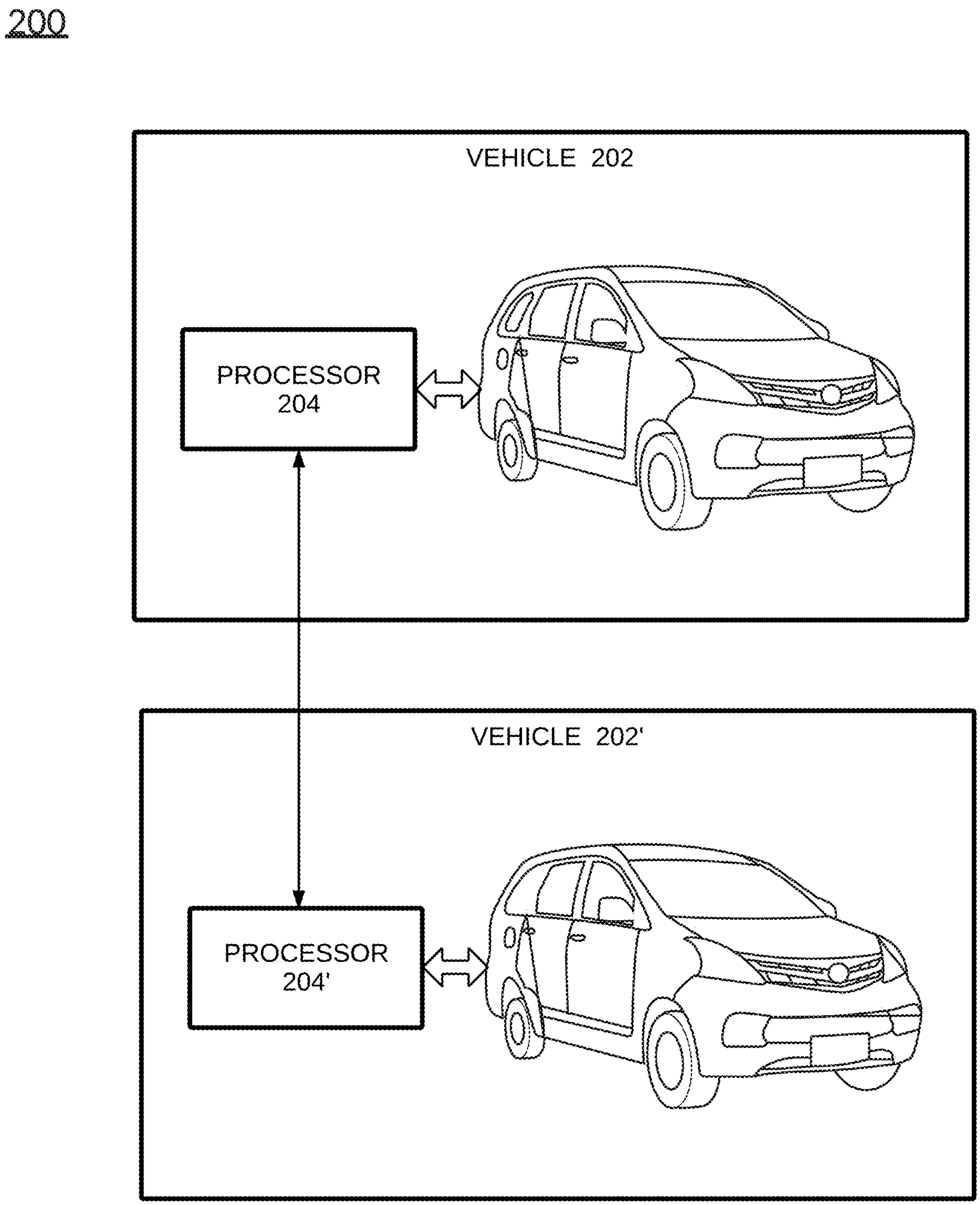
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
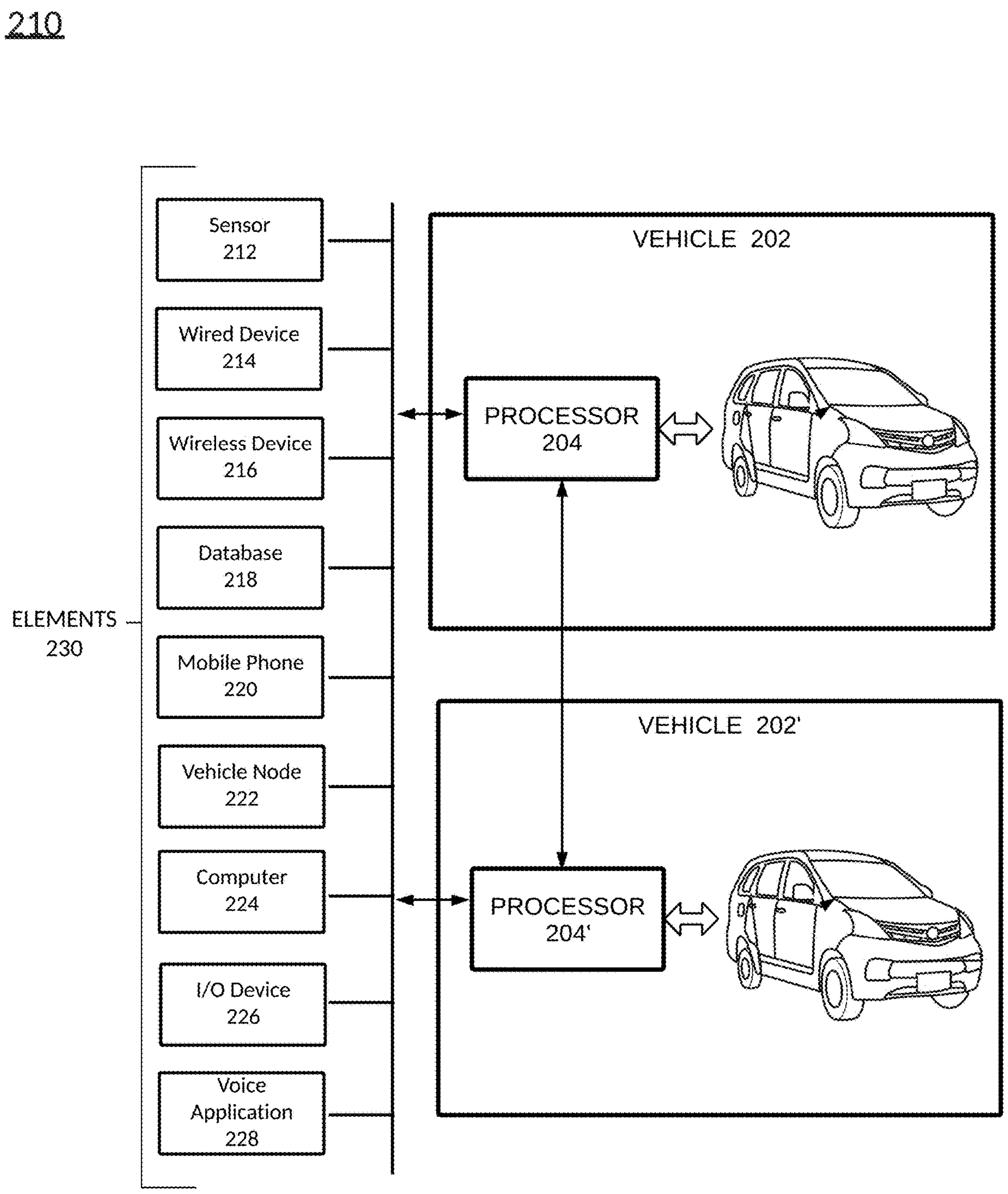
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, input/output (I/O) device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
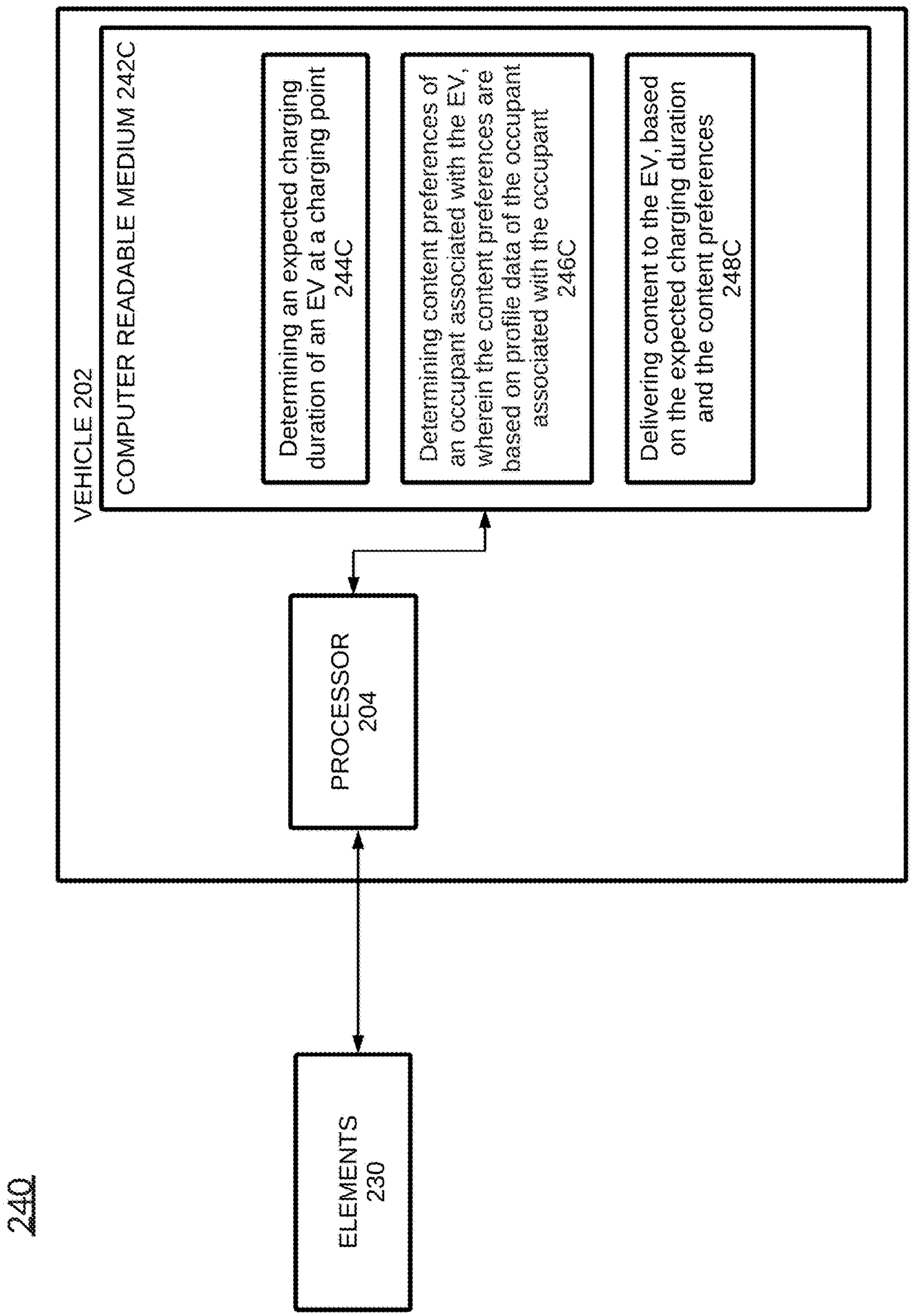
FIG. 2C illustrates yet another vehicle network diagram, according to example embodiments.

FIG. 2C illustrates yet another vehicle network diagram 240, according to example embodiments. The network comprises elements including a vehicle 202, a processor 204, and a non-transitory computer readable medium 242C. The processor 204 is communicably coupled to the computer readable medium 242C and elements 230 (which were depicted in FIG. 2B). The vehicle 202 may be a vehicle, server, or any device with a processor and memory.

The processor 204 performs one or more of determining an expected charging duration of an EV at a charging point 244C, determining content preferences of an occupant associated with the EV, wherein the content preferences are based on profile data of the occupant associated with the occupant 246C, and delivering content to the EV, based on the expected charging duration and the content preferences 248C.

Figure 2D:
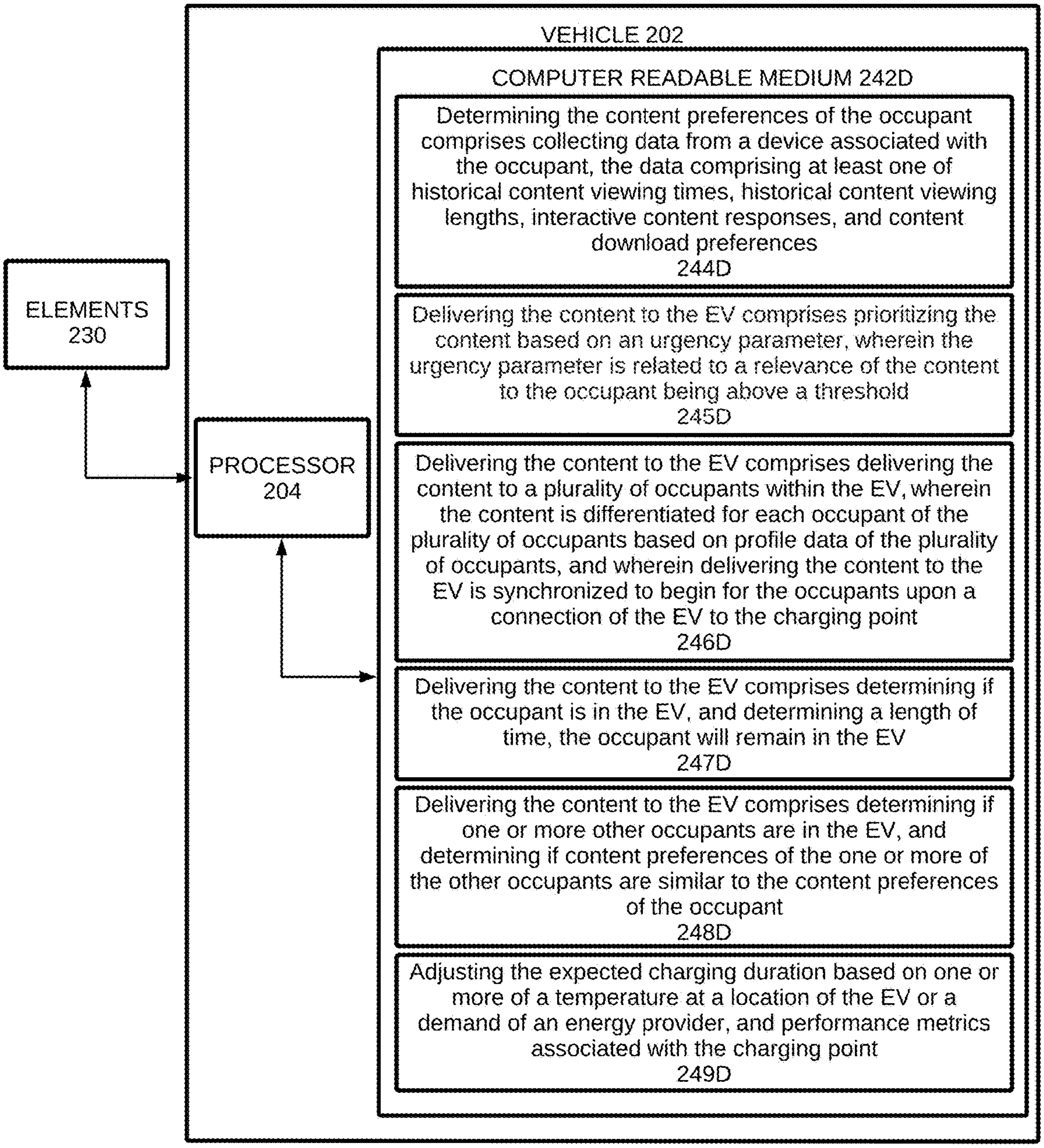
FIG. 2D illustrates a further vehicle network diagram, according to example embodiments.

FIG. 2D illustrates a further vehicle network diagram 250, according to example embodiments. The network comprises elements including a vehicle 202 a processor 204, and a non-transitory computer readable medium 242D. The processor 204 is communicably coupled to the computer readable medium 242D and elements 230 (which were depicted in FIG. 2B). The vehicle 202 may be a vehicle, server or any device with a processor and memory.

The processor 204 performs one or more of determining the content preferences of the occupant comprises collecting data from a device associated with the occupant, the data comprising at least one of historical content viewing times, historical content viewing lengths, interactive content responses, and content download preferences 244D, delivering the content to the EV comprises prioritizing the content based on an urgency parameter, wherein the urgency parameter is related to a relevance of the content to the occupant being above a threshold 245D, delivering the content to the EV comprises delivering the content to a plurality of occupants within the EV, wherein the content is differentiated for each occupant of the plurality of occupants based on profile data of the plurality of occupants, and wherein delivering the content to the EV is synchronized to begin for the occupants upon a connection of the EV to the charging point 246D, delivering the content to the EV comprises determining if the occupant is in the EV, and determining a length of time the occupant will remain in the EV 247D, delivering the content to the EV comprises determining if one or more other occupants are in the EV, and determining if content preferences of the one or more of the other occupants are similar to the content preferences of the occupant 248D, and adjusting the expected charging duration based on one or more of a temperature at a location of the EV or a demand of an energy provider, and performance metrics associated with the charging point 249D.

While this example describes in detail only one vehicle 202, multiple such nodes may be connected to the blockchain. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 may be a vehicle, server or any device with a processor and memory.

The processor 204 performs one or more of receiving a confirmation of an event from one or more elements described or depicted herein, wherein the confirmation comprises a blockchain consensus between peers represented by any of the elements and executing a smart contract to record the confirmation on the blockchain consensus. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable medium may fully or partially reside in the interior or exterior of the vehicles. The steps or features stored in the computer readable medium may be fully or partially performed by any of the processors and/or elements in any order. Additionally, one or more steps or features may be added, omitted, combined, performed at a later time, etc.

Figure 2E:
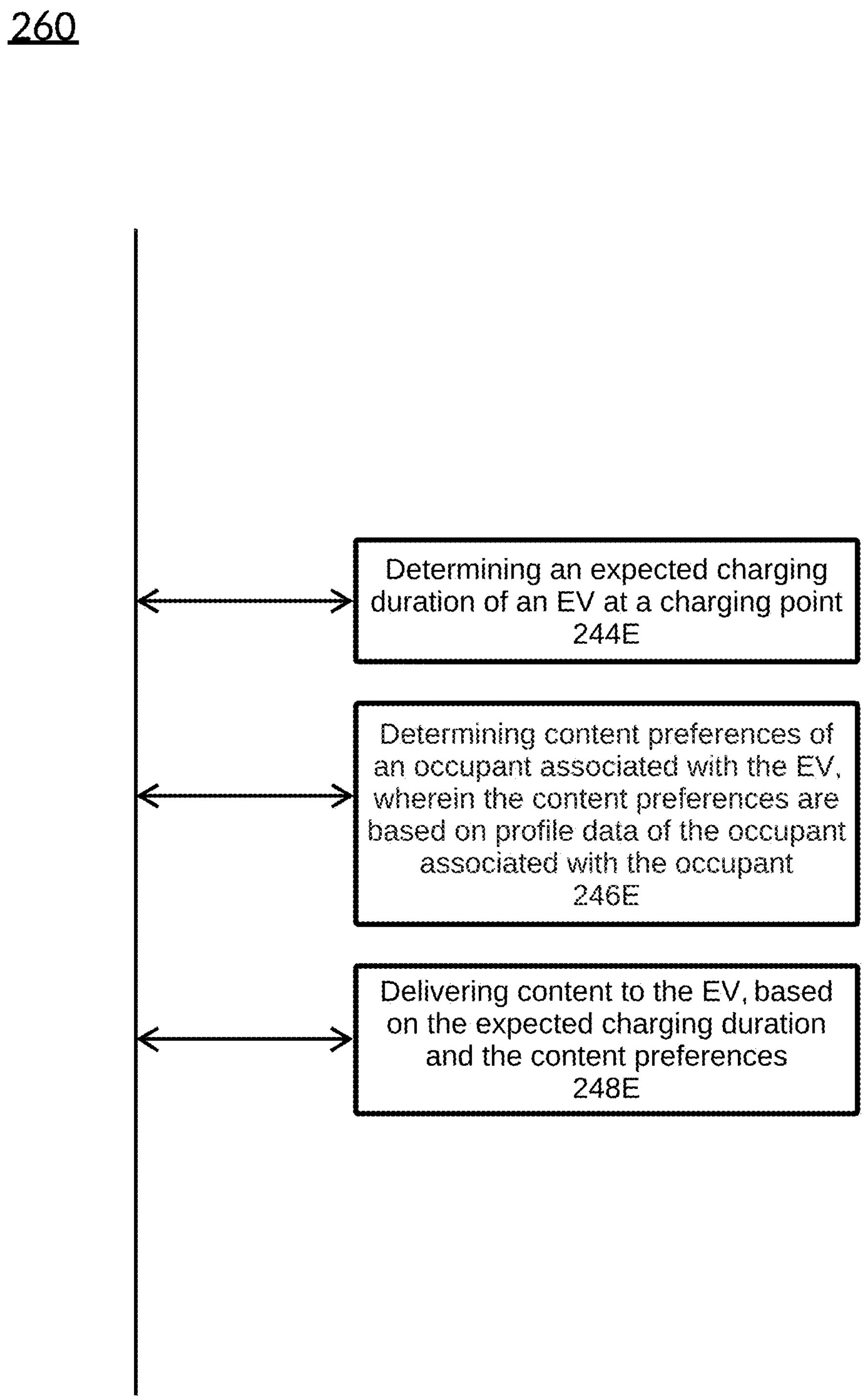
FIG. 2E illustrates a flow diagram, according to example embodiments.

FIG. 2E illustrates a flow diagram 260, according to example embodiments. Referring to FIG. 2E, the instant solution includes one or more of determining an expected charging duration of an EV at a charging point 244E, determining content preferences of an occupant associated with the EV, wherein the content preferences are based on profile data of the occupant associated with the occupant 246E, and delivering content to the EV, based on the expected charging duration and the content preferences 248E.

Figure 2F:
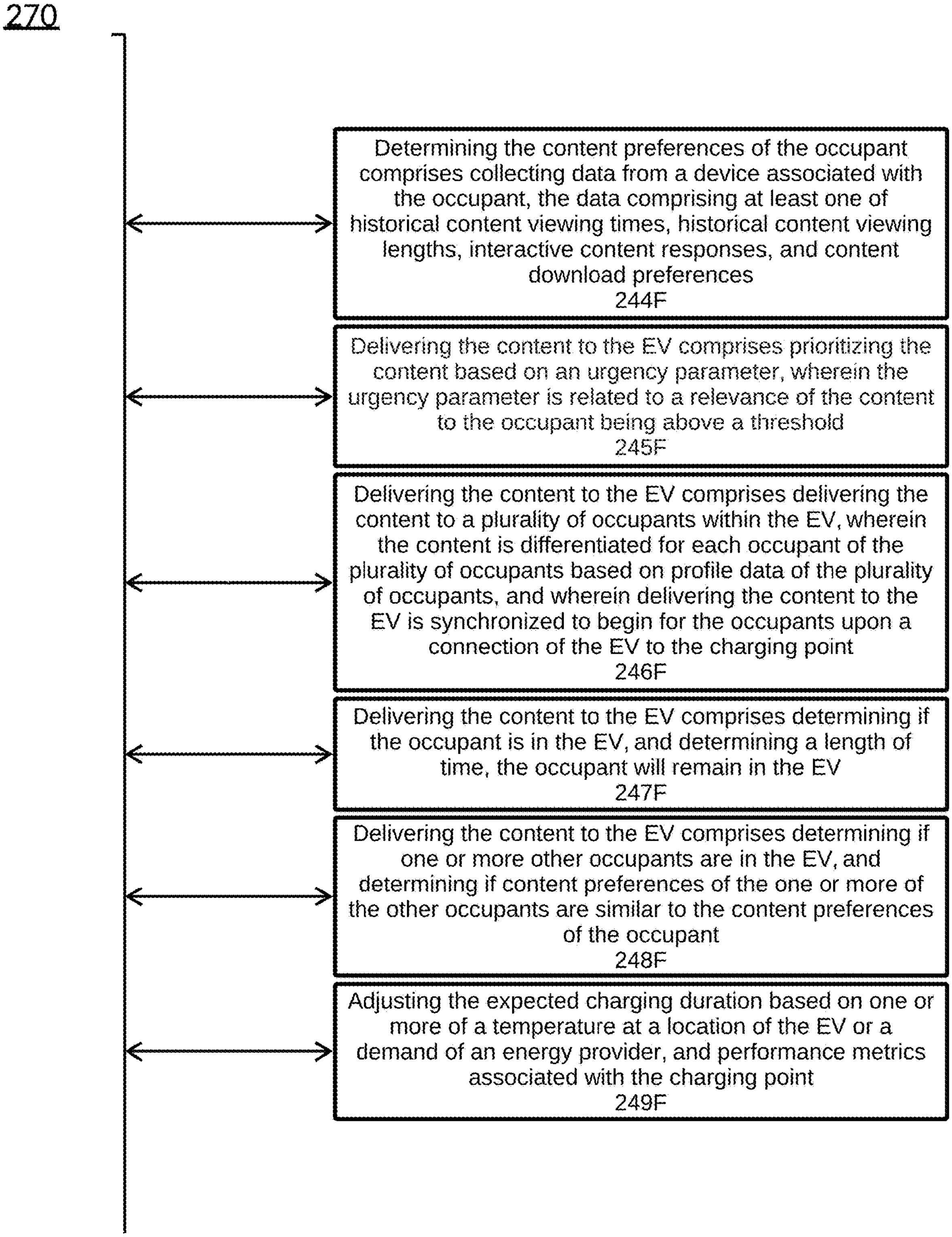
FIG. 2F illustrates another flow diagram, according to example embodiments.

FIG. 2F illustrates another flow diagram 270, according to example embodiments. Referring to FIG. 2F, the instant solution includes one or more of determining the content preferences of the occupant comprises collecting data from a device associated with the occupant, the data comprising at least one of historical content viewing times, historical content viewing lengths, interactive content responses, and content download preferences 244F, delivering the content to the EV comprises prioritizing the content based on an urgency parameter, wherein the urgency parameter is related to a relevance of the content to the occupant being above a threshold 245F, delivering the content to the EV comprises delivering the content to a plurality of occupants within the EV, wherein the content is differentiated for each occupant of the plurality of occupants based on profile data of the plurality of occupants, and wherein delivering the content to the EV is synchronized to begin for the occupants upon a connection of the EV to the charging point 246F, delivering the content to the EV comprises determining if the occupant is in the EV, and determining a length of time, the occupant will remain in the EV 247F, delivering the content to the EV comprises determining if one or more other occupants are in the EV, and determining if content preferences of the one or more of the other occupants are similar to the content preferences of the occupant 248F, and adjusting the expected charging duration based on one or more of a temperature at a location of the EV or a demand of an energy provider, and performance metrics associated with the charging point 249F.

Technological advancements typically build upon the fundamentals of predecessor technologies; such is the case with Artificial Intelligence (AI) models. An AI classification system describes the stages of AI progression. The first classification is known as “Reactive Machines,” followed by present-day AI classification “Limited Memory Machines” (also known as “Artificial Narrow Intelligence”), then progressing to “Theory of Mind” (also known as “Artificial General Intelligence”), and reaching the AI classification “Self-Aware” (also known as “Artificial Superintelligence”). Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines. Examples of AI models classified as Limited Memory Machines include, but are not limited to, Chatbots, Virtual Assistants, Machine Learning (ML), Deep Learning (DL), Natural Language Processing (NLP), Generative AI (GenAI) models, and any future AI models that are yet to be developed possessing characteristics of Limited Memory Machines. Generative AI models combine Limited Memory Machine technologies, incorporating ML and DL, forming the foundational building blocks of future AI models. For example, Theory of Mind is the next progression of AI that may be able to perceive, connect, and react by generating appropriate reactions in response to an entity with which the AI model is interacting; all of these capabilities rely on the fundamentals of Generative AI. Furthermore, in an evolution into the Self-Aware classification, AI models will be able to understand and evoke emotions in the entities they interact with, as well as possessing their own emotions, beliefs, and needs, all of which rely on Generative AI fundamentals of learning from experiences to generate and draw conclusions about itself and its surroundings. Generative AI models are integral and core to future artificial intelligence models. As described herein, Generative AI refers to present-day Generative AI models and future AI models.

Figure 3A:
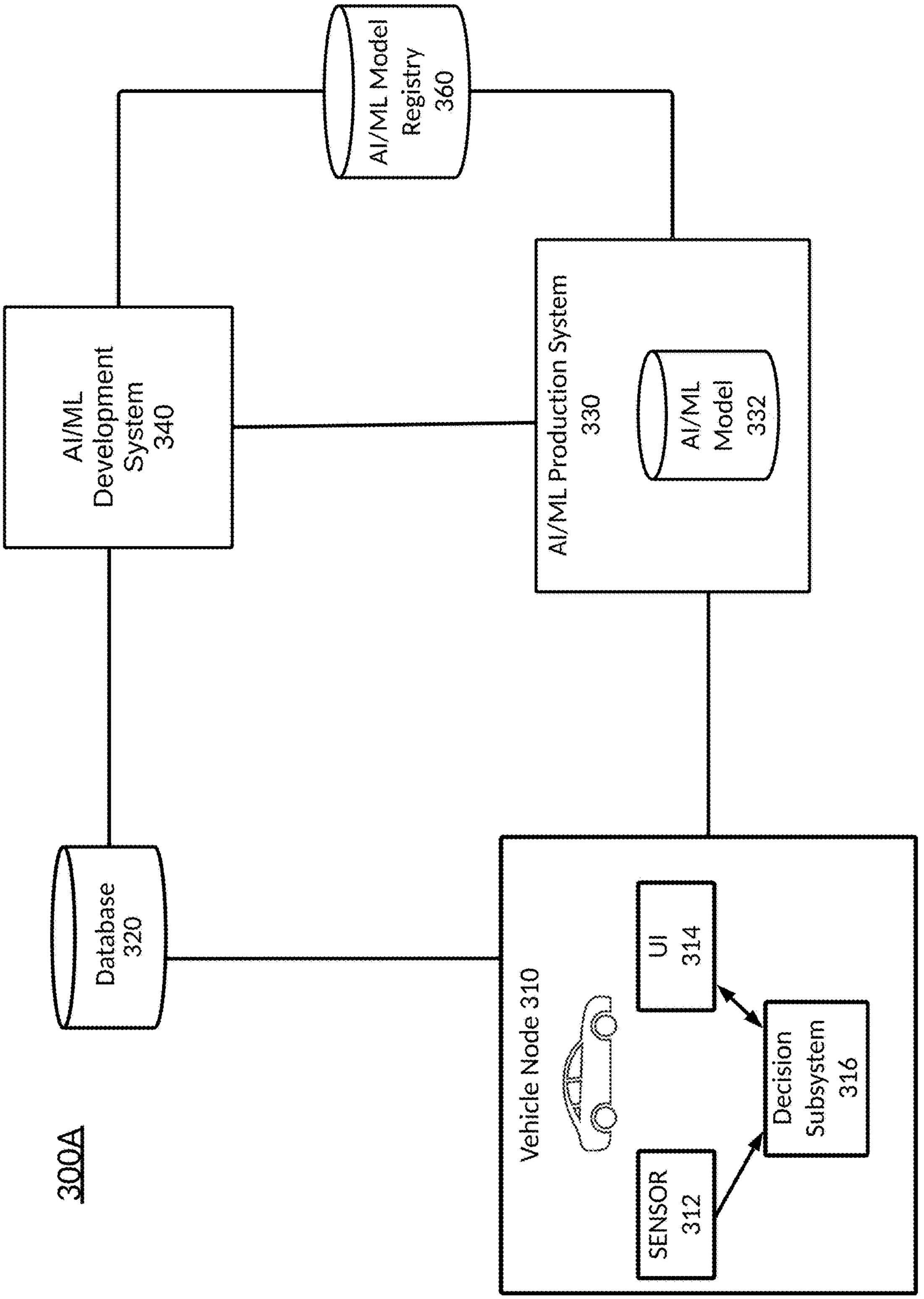
FIG. 3A illustrates an Artificial Intelligence (AI)/Machine Learning (ML) network diagram for integrating an artificial intelligence (AI) model into any decision point in the example embodiments.

FIG. 3A illustrates an AI/ML network diagram 300A that supports AI-assisted vehicle or occupant decision points. Other branches of AI, such as, but not limited to, computer vision, fuzzy logic, expert systems, neural networks/deep learning, generative AI, and natural language processing, may all be employed in developing the AI model shown in these embodiments. Further, the AI model included in these embodiments is not limited to particular AI algorithms. Any algorithm or combination of algorithms related to supervised, unsupervised, and reinforcement learning algorithms may be employed.

In one embodiment, Generative AI (GenAI) may be used by the instant solution in the transformation of data. Vehicles are equipped with diverse sensors, cameras, radars, and LIDARs, which collect a vast array of data, such as images, speed readings, GPS data, and acceleration metrics. However, raw data, once acquired, undergoes preprocessing that may involve normalization, anonymization, missing value imputation, or noise reduction to allow the data to be further used effectively.

The GenAI executes data augmentation following the preprocessing of the data. Due to the limitation of datasets in capturing the vast complexity of real-world vehicle scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation is then performed on the data. Tools like Generative Adversarial Networks (GANs) and Variational Autoencoders (VAEs) are trained on existing datasets to generate new, plausible data samples. For example, GANs might be tasked with crafting images showcasing vehicles in uncharted conditions or from unique perspectives. As another example, the synthesis of sensor data may be performed to model and create synthetic readings for such scenarios, enabling thorough system testing without actual physical encounters. A critical step in the use of GenAI, given the safety-critical nature of vehicles, is validation. This validation might include the output data being compared with real-world datasets or using specialized tools like a GAN discriminator to gauge the realism of the crafted samples.

Vehicle node 310 may include a plurality of sensors 312 that may include but are not limited to, light sensors, weight sensors, cameras, lidar, and radar. In some embodiments, these sensors 312 send data to a database 320 that stores data about the vehicle and occupants of the vehicle. In some embodiments, these sensors 312 send data to one or more decision subsystems 316 in vehicle node 310 to assist in decision-making.

Vehicle node 310 may include one or more user interfaces (UIs) 314, such as a steering wheel, navigation controls, audio/video controls, temperature controls, etc. In some embodiments, these UIs 314 send data to a database 320 that stores event data about the UIs 314 that includes but is not limited to selection, state, and display data. In some embodiments, these UIs 314 send data to one or more decision subsystems 316 in vehicle node 310 to assist decision-making.

Vehicle node 310 may include one or more decision subsystems 316 that drive a decision-making process around, but are not limited to, vehicle control, temperature control, charging control, etc. In some embodiments, the decision subsystems 316 gather data from one or more sensors 312 to aid in the decision-making process. In some embodiments, a decision subsystem 316 may gather data from one or more UIs 314 to aid in the decision-making process. In some embodiments, a decision subsystem 316 may provide feedback to a UI 314.

An AI/ML production system 330 may be used by a decision subsystem 316 in a vehicle node 310 to assist in its decision-making process. The AI/ML production system 330 includes one or more AI/ML models 332 that are executed to retrieve the needed data, such as, but not limited to, a prediction, a categorization, a UI prompt, etc. In some embodiments, an AI/ML production system 330 is hosted on a server. In some embodiments, the AI/ML production system 330 is cloud-hosted. In some embodiments, the AI/ML production system 330 is deployed in a distributed multi-node architecture. In some embodiments, the AI production system resides in vehicle node 310.

An AI/ML development system 340 creates one or more AI/ML models 332. In some embodiments, the AI/ML development system 340 utilizes data in the database 320 to develop and train one or more AI models 332. In some embodiments, the AI/ML development system 340 utilizes feedback data from one or more AI/ML production systems 330 for new model development and/or existing model re-training. In an embodiment, the AI/ML development system 340 resides and executes on a server. In another embodiment the AI/ML development system 340 is cloud hosted. In a further embodiment, the AI/ML development system 340 utilizes a distributed data pipeline/analytics engine.

Once an AI/ML model 332 has been trained and validated in the AI/ML development system 340, it may be stored in an AI/ML model registry 360 for retrieval by either the AI/ML development system 340 or by one or more AI/ML production systems 330. The AI/ML model registry 360 resides in a dedicated server in one embodiment. In some embodiments, the AI/ML model registry 360 is cloud-hosted. The AI/ML model registry 360 is a distributed database in other embodiments. In further embodiments, the AI/ML model registry 360 resides in the AI/ML production system 330.

Figure 3B:
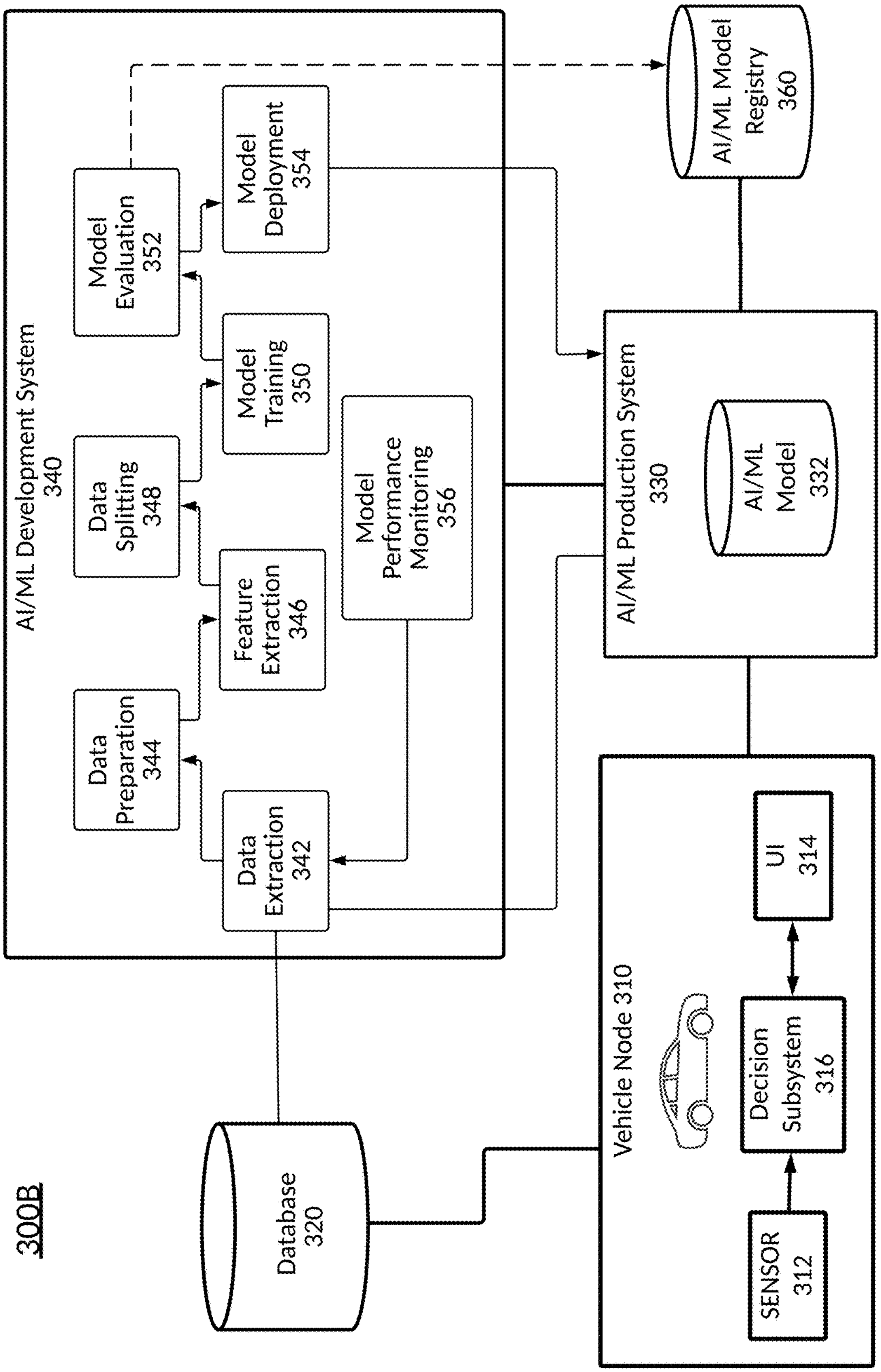
FIG. 3B illustrates a process for developing an Artificial Intelligence (AI)/Machine Learning (ML) model that supports AI-assisted vehicle or occupant decision points.

FIG. 3B illustrates a process 300B for developing one or more AI/ML models that support AI-assisted vehicle or occupant decision points. An AI/ML development system 340 executes steps to develop an AI/ML model 332 that begins with data extraction 342, in which data is loaded and ingested from one or more data sources. In some embodiments, vehicle and user data is extracted from a database 320. In some embodiments, model feedback data is extracted from one or more AI/ML production systems 330.

Once the required data has been extracted 342, it must be prepared 344 for model training. In some embodiments, this step involves statistical testing of the data to see how well it reflects real-world events, its distribution, the variety of data in the dataset, etc. In some embodiments, the results of this statistical testing may lead to one or more data transformations being employed to normalize one or more values in the dataset. In some embodiments, this step includes cleaning data deemed to be noisy. A noisy dataset includes values that do not contribute to the training, such as but are not limited to, null and long string values. Data preparation 344 may be a manual process or an automated process using one or more of the elements, functions described or depicted herein.

Features of the data are identified and extracted 346. In some embodiments, a feature of the data is internal to the prepared data from step 344. In other embodiments, a feature of the data requires a piece of prepared data from step 344 to be enriched by data from another data source to be useful in developing an AI/ML model 332. In some embodiments, identifying features is a manual process or an automated process using one or more of the elements, functions described or depicted herein. Once the features have been identified, the values of the features are collected into a dataset that will be used to develop the AI/ML model 332.

The dataset output from feature extraction step 346 is split 348 into a training and validation data set. The training data set is used to train the AI/ML model 332, and the validation data set is used to evaluate the performance of the AI/ML model 332 on unseen data.

The AI/ML model 332 is trained and tuned 350 using the training data set from the data splitting step 348. In this step, the training data set is fed into an AI/ML algorithm and an initial set of algorithm parameters. The performance of the AI/ML model 332 is then tested within the AI/ML development system 340 utilizing the validation data set from step 348. These steps may be repeated with adjustments to one or more algorithm parameters until the model's performance is acceptable based on various goals and/or results.

The AI/ML model 332 is evaluated 352 in a staging environment (not shown) that resembles the ultimate AI/ML production system 330. This evaluation uses a validation dataset to ensure the performance in an AI/ML production system 330 matches or exceeds expectations. In some embodiments, the validation dataset from step 348 is used. In other embodiments, one or more unseen validation datasets are used. In some embodiments, the staging environment is part of the AI/ML development system 340. In other embodiments, the staging environment is managed separately from the AI/ML development system 340. Once the AI/ML model 332 has been validated, it is stored in an AI/ML model registry 360, which can be retrieved for deployment and future updates. As before, in some embodiments, the model evaluation step 352 is a manual process or an automated process using one or more of the elements, functions described or depicted herein.

Once an AI/ML model 332 has been validated and published to an AI/ML model registry 360, it may be deployed 354 to one or more AI/ML production systems 330. In some embodiments, the performance of deployed AI/ML models 332 is monitored 356 by the AI/ML development system 340. In some embodiments, AI/ML model 332 feedback data is provided by the AI/ML production system 330 to enable model performance monitoring 356. In some embodiments, the AI/ML development system 340 periodically requests feedback data for model performance monitoring 356. In some embodiments, model performance monitoring includes one or more triggers that result in the AI/ML model 332 being updated by repeating steps 342-354 with updated data from one or more data sources.

Figure 3C:
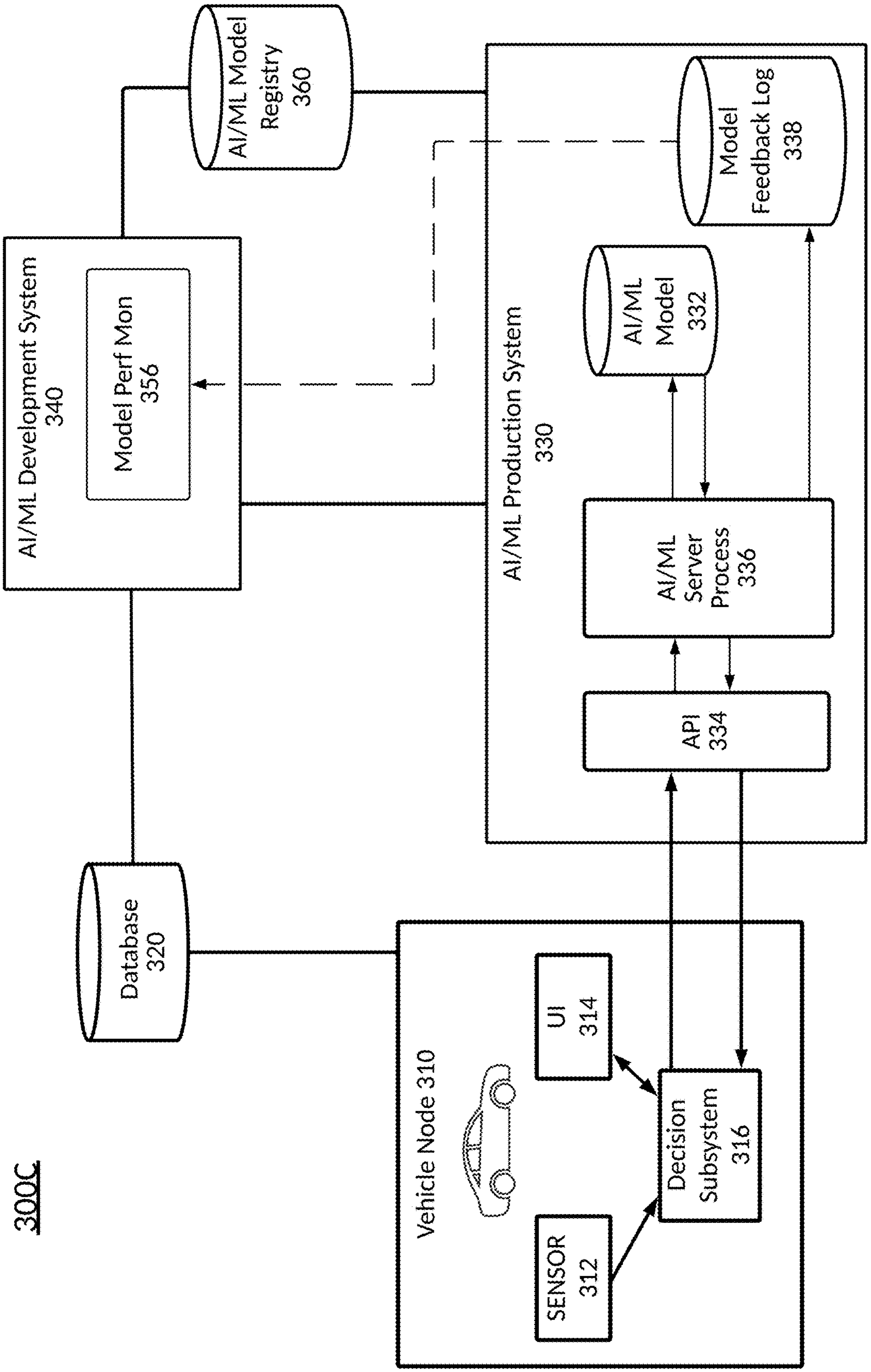
FIG. 3C illustrates a process for utilizing an Artificial Intelligence (AI)/Machine Learning (ML) model that supports AI-assisted vehicle or occupant decision points.

FIG. 3C illustrates a process 300C for utilizing an AI/ML model that supports AI-assisted vehicle or occupant decision points. As stated previously, the AI model utilization process depicted herein reflects ML, which is a particular branch of AI, but the instant solution is not limited to ML and is not limited to any AI algorithm or combination of algorithms.

Referring to FIG. 3C, an AI/ML production system 330 may be used by a decision subsystem 316 in vehicle node 310 to assist in its decision-making process. The AI/ML production system 330 provides an application programming interface (API) 334, executed by an AI/ML server process 336 through which requests can be made. In some embodiments, a request may include an AI/ML model 332 identifier to be executed. In some embodiments, the AI/ML model 332 to be executed is implicit based on the type of request. In some embodiments, a data payload (e.g., to be input to the model during execution) is included in the request. In some embodiments, the data payload includes sensor 312 data from vehicle node 310. In some embodiments, the data payload includes UI 314 data from vehicle node 310. In some embodiments, the data payload includes data from other vehicle node 310 subsystems (not shown), including but not limited to, occupant data subsystems. In an embodiment, one or more elements or nodes 320, 330, 340, or 360 may be located in the vehicle 310.

Upon receiving the API 334 request, the AI/ML server process 336 may need to transform the data payload or portions of the data payload to be valid feature values into an AI/ML model 332. Data transformation may include but is not limited to combining data values, normalizing data values, and enriching the incoming data with data from other data sources. Once any required data transformation occurs, the AI/ML server process 336 executes the appropriate AI/ML model 332 using the transformed input data. Upon receiving the execution result, the AI/ML server process 336 responds to the API caller, which is a decision subsystem 316 of vehicle node 310. In some embodiments, the response may result in an update to a UI 314 in vehicle node 310. In some embodiments, the response includes a request identifier that can be used later by the decision subsystem 316 to provide feedback on the AI/ML model 332 performance. Further, in some embodiments, immediate performance feedback may be recorded into a model feedback log 338 by the AI/ML server process 336. In some embodiments, execution model failure is a reason for immediate feedback.

In some embodiments, the API 334 includes an interface to provide AI/ML model 332 feedback after an AI/ML model 332 execution response has been processed. This mechanism may be used to evaluate the performance of the AI/ML model 332 by enabling the API caller to provide feedback on the accuracy of the model results. For example, if the AI/ML model 332 provided an estimated time of arrival of 20 minutes, but the actual travel time was 24 minutes, that may be indicated. In some embodiments, the feedback interface includes the identifier of the initial request so that it can be used to associate the feedback with the request. Upon receiving a call into the feedback interface of API 334, the AI/ML server process 336 records the feedback in the model feedback log 338. In some embodiments, the data in this model feedback log 338 is provided to model performance monitoring 356 in the AI/ML development system 340. This log data is streamed to the AI/ML development system 340 in one embodiment. In some embodiments, the log data is provided upon request.

A number of the steps/features that may utilize the AI/ML process described herein include one or more of determining an expected charging duration of an EV at a charging point, determining content preferences of an occupant associated with the EV, wherein the content preferences are based on profile data of the occupant associated with the occupant, and delivering content to the EV, based on the expected charging duration and the content preferences.

The steps/features may also include one or more of determining the content preferences of the occupant comprises collecting data from a device associated with the occupant, the data comprising at least one of historical content viewing times, historical content viewing lengths, interactive content responses, and content download preferences, delivering the content to the EV comprises prioritizing the content based on an urgency parameter, wherein the urgency parameter is related to a relevance of the content to the occupant being above a threshold, delivering the content to the EV comprises delivering the content to a plurality of occupants within the EV, wherein the content is differentiated for each occupant of the plurality of occupants based on profile data of the plurality of occupants, and wherein delivering the content to the EV is synchronized to begin for the occupants upon a connection of the EV to the charging point, delivering the content to the EV comprises determining if the occupant is in the EV, and determining a length of time, the occupant will remain in the EV, delivering the content to the EV comprises determining if one or more other occupants are in the EV, and determining if content preferences of the one or more of the other occupants are similar to the content preferences of the occupant, and adjusting the expected charging duration based on one or more of a temperature at a location of the EV or a demand of an energy provider, and performance metrics associated with the charging point.

Data associated with any of these steps/features, as well as any other features or functionality described or depicted herein, the AI/ML production system 330, as well as one or more of the other elements depicted in FIG. 3C may be used to process this data in a pre-transformation and/or post-transformation process. Data related to this process can be used by the vehicle node 310. In one embodiment, data related to this process may be used with a charging station/charging point, a server, a wireless device, and/or any of the processors described or depicted herein.

Figure 3D:
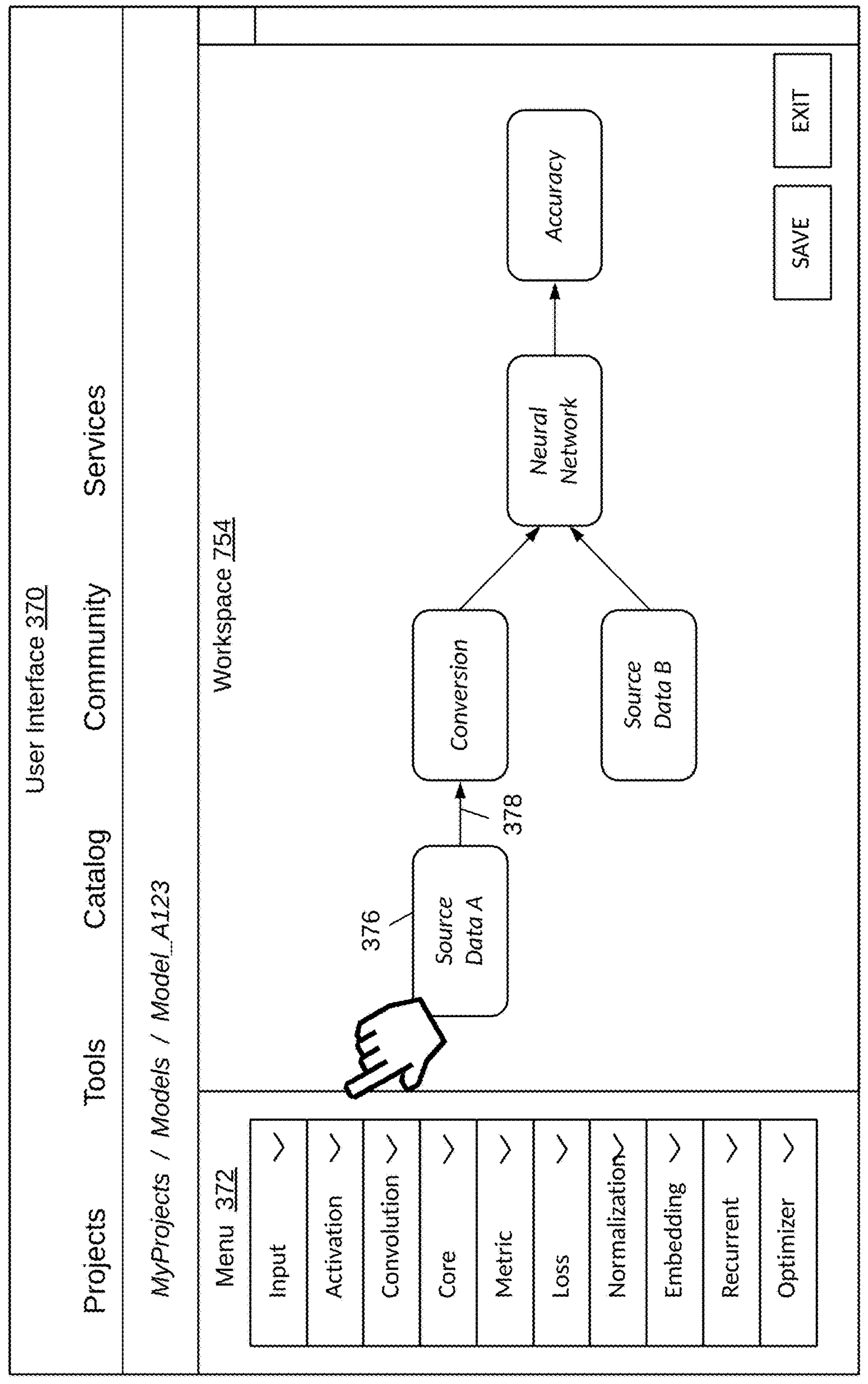
FIG. 3D illustrates a machine learning network diagram, according to example embodiments.

FIG. 3D illustrates a process 300D of designing a new machine learning model via a user interface 370 of the system according to example embodiments. As an example, a model may be output as part of the AI/ML Development System 340. Referring to FIG. 3D, a user can use an input mechanism from a menu 372 of a user interface 370 to add pieces/components to a model being developed within a workspace 754 of the user interface 370.

The menu 372 includes a plurality of graphical user interface (GUI) menu options which can be selected to reveal additional components that can be added to the model design shown in the workspace. The GUI menu includes options for adding elements to the workspace, such as features which may include neural networks, machine learning models, AI models, data sources, conversion processes (e.g., vectorization, encoding, etc.), analytics, etc. The user can continue to add features to the model and connect them using edges or other means to create a flow within the workspace. For example, the user may add a node 376 to a flow of a new model within the workspace. For example, the user may connect the node 376 to another node in the diagram via an edge 378, creating a dependency within the diagram. When the user is done, the user can save the model for subsequent training/testing.

In another example, the name of the object can be identified from a web page or a user interface 370 where the object is visible within a browser or the workspace on the user device. A pop-up within the browser or the workspace can be overlayed where the object is visible, which includes an option to navigate to the identified web page corresponding to the alternative object via a rule set.

Figure 3E:
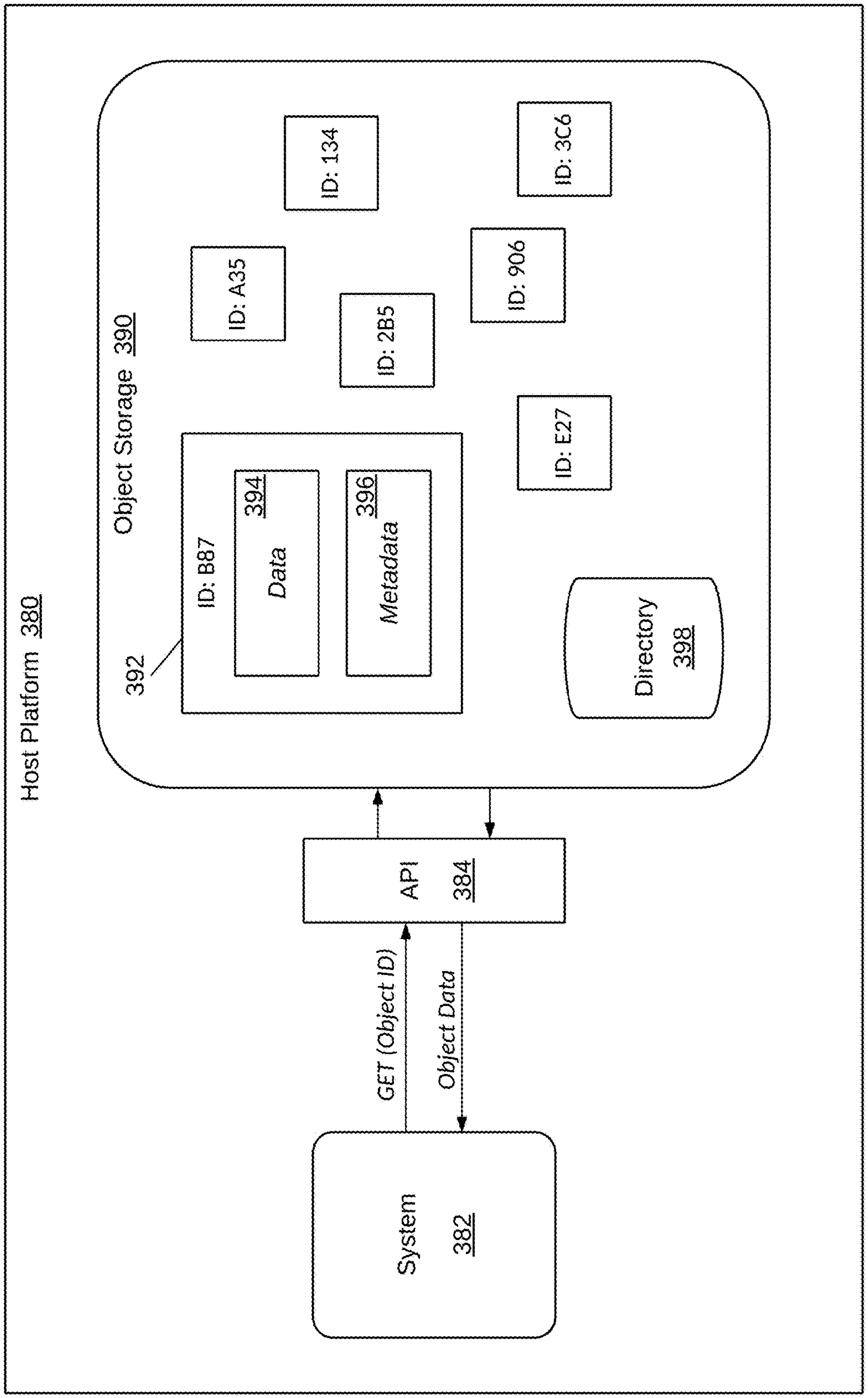
FIG. 3E illustrates a machine learning network diagram, according to example embodiments.

FIG. 3E illustrates a process 300E of accessing an object 392 from an object storage 390 of the host platform 380 according to example embodiments. For example, the object storage 390 may store data that is used by the AI models and machine learning (ML) models, training data, expected outputs for testing, training results, and the like. The object storage 390 may also store any other kind of data. Each object may include a unique identifier, a data section 394, and a metadata section 396, which provide a descriptive context associated with the data, including data that can later be extracted for purposes of machine learning. The unique identifier may uniquely identify an object with respect to all other objects in the object storage 390. The data section 394 may include unstructured data such as web pages, digital content, images, audio, text, and the like.

Instead of breaking files into blocks stored on disks in a file system, the object storage 390 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application can use to locate and access it. In this case, the metadata is more descriptive than a file-based approach. The metadata can be customized with additional context that can later be extracted and leveraged for other purposes, such as data analytics.

The objects that are stored in the object storage 390 may be accessed via an API 384. The API 384 may be a Hypertext Transfer Protocol (HTTP)-based RESTful API (also known as a RESTful Web service). The API 384 can be used by the client application to query an object's metadata to locate the desired object (data) via the Internet from anywhere on any device. The API 384 may use HTTP commands such as "PUT" or "POST" to upload an object, "GET" to retrieve an object, "DELETE" to remove an object, and the like.

The object storage 390 may provide a directory 398 that uses the metadata of the objects to locate appropriate data files. The directory 398 may contain descriptive information about each object stored in the object storage 390, such as a name, a unique identifier, a creation timestamp, a collection name, etc. To query the object within the object storage 390, the client application may submit a command, such as an HTTP command, with an identifier of the object 392, a payload, etc. The object storage 390 can store the actions and results described herein, including associating two or more lists of ranked assets with one another based on variables used by the two or more lists of ranked assets that have a correlation above a predetermined threshold.

Figure 4A:
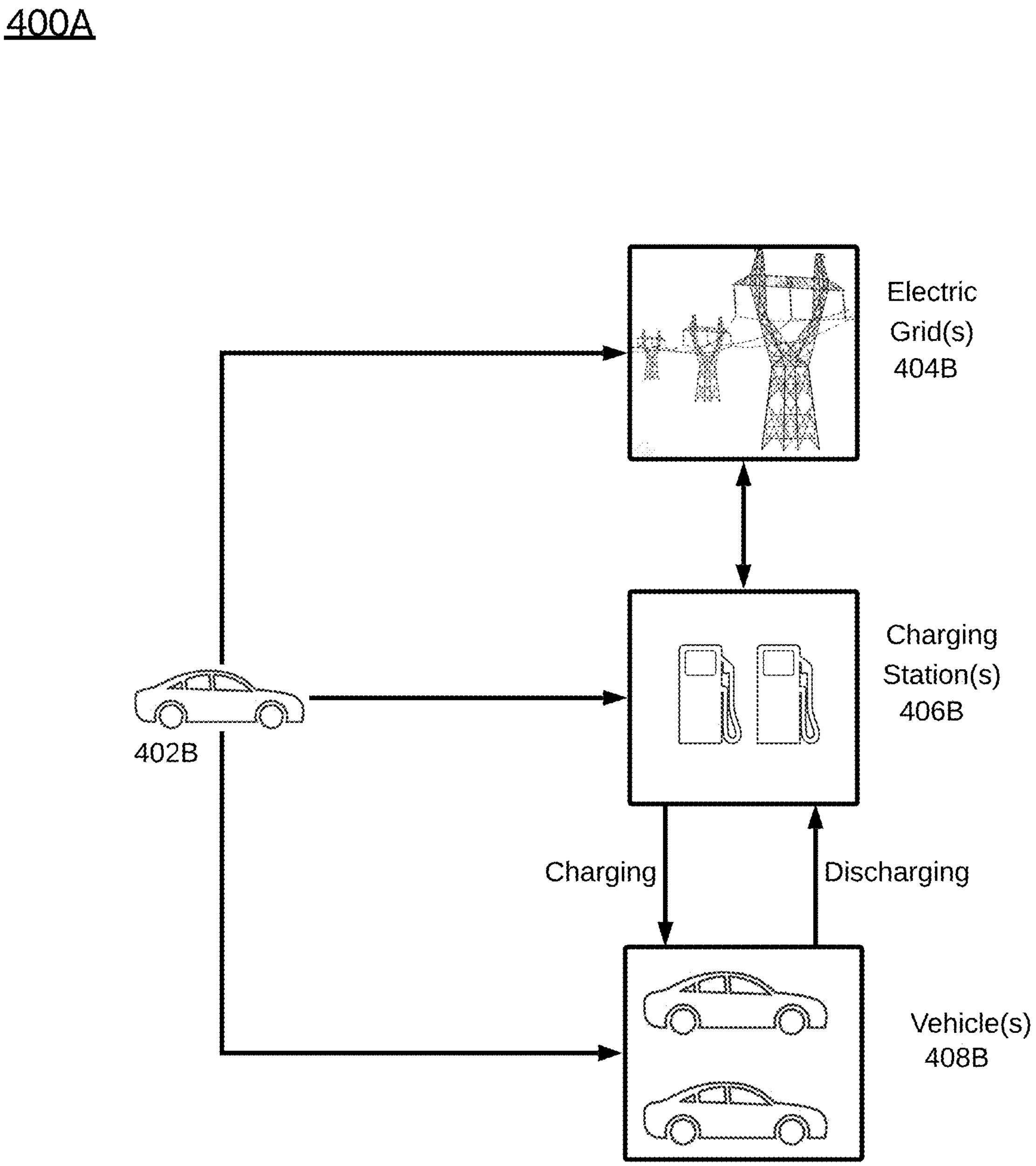
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via V2V technology, communication over cellular, Wi-Fi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/408B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can transfer energy from the vehicle to the grid 404B, otherwise referred to as "V2G". In bidirectional charging, the electricity flows both ways; to the vehicle and from the vehicle. When a vehicle is charged, alternating current (AC) electricity from the grid 404B is converted to direct current (DC). This may be performed by one or more of the vehicle's own converter or a converter on the charging station 406B. The energy stored in the vehicle's batteries may be sent in an opposite direction back to the grid. The energy is converted from DC to AC through a converter usually located in the charging station 406B, otherwise referred to as a bidirectional charger. Further, the instant solution as described and depicted with respect to FIG. 4B can be utilized in this and other networks and/or systems.

Figure 4B:
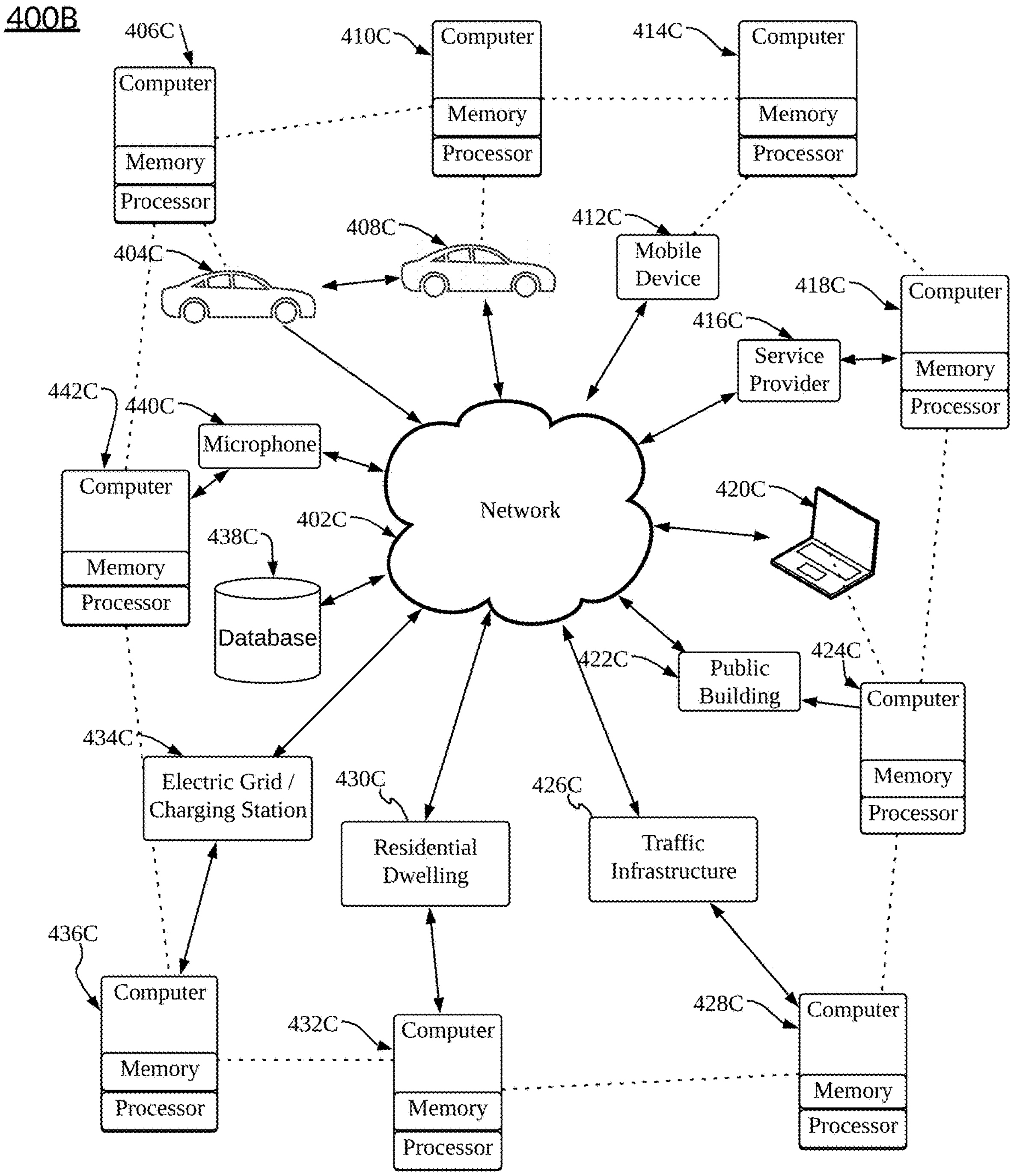
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C and 410C associated with various entities, all communicably coupled and in communication with a network 402C. A database 438C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, and 410C. The one or more public buildings 422C may include various agencies. The one or more public buildings 422C may utilize a computing device 424C. The one or more service provider 416C may include a dealership, a tow truck service, a collision center, or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
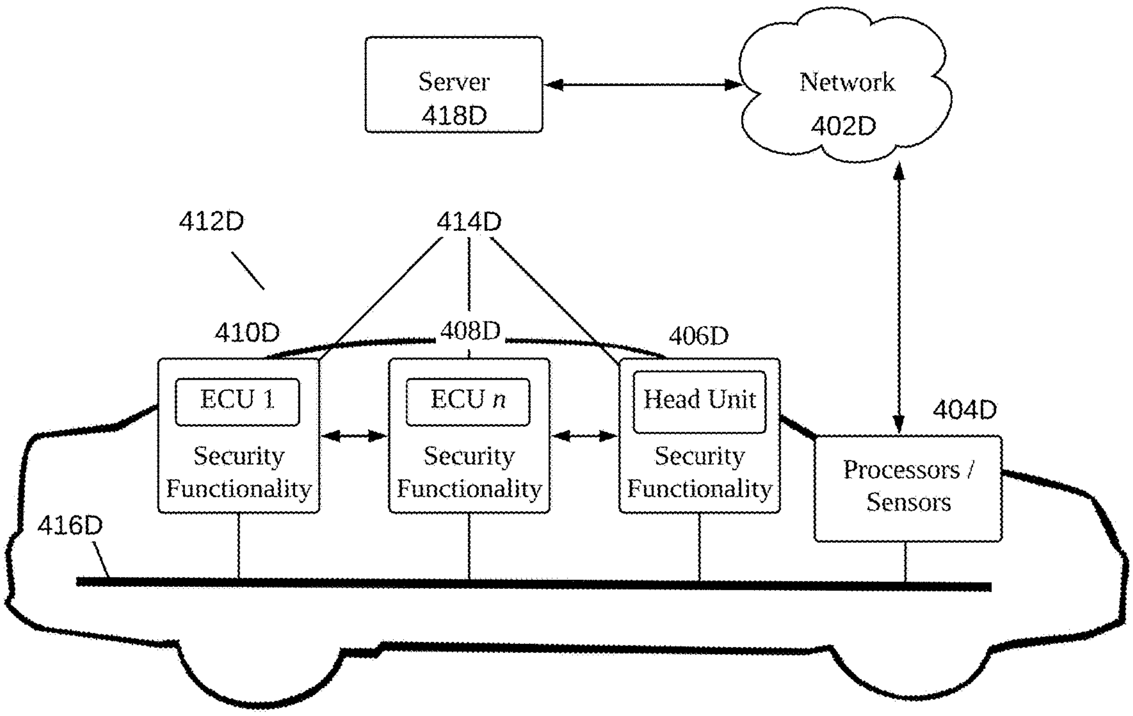
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An ECU is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's CAN Bus. When an ECU encounters a process that is unauthorized, that ECU can block the process from operating. Automotive ECUs can use different contexts to determine whether a process is operating within its permitted bounds, such as proximity contexts, nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
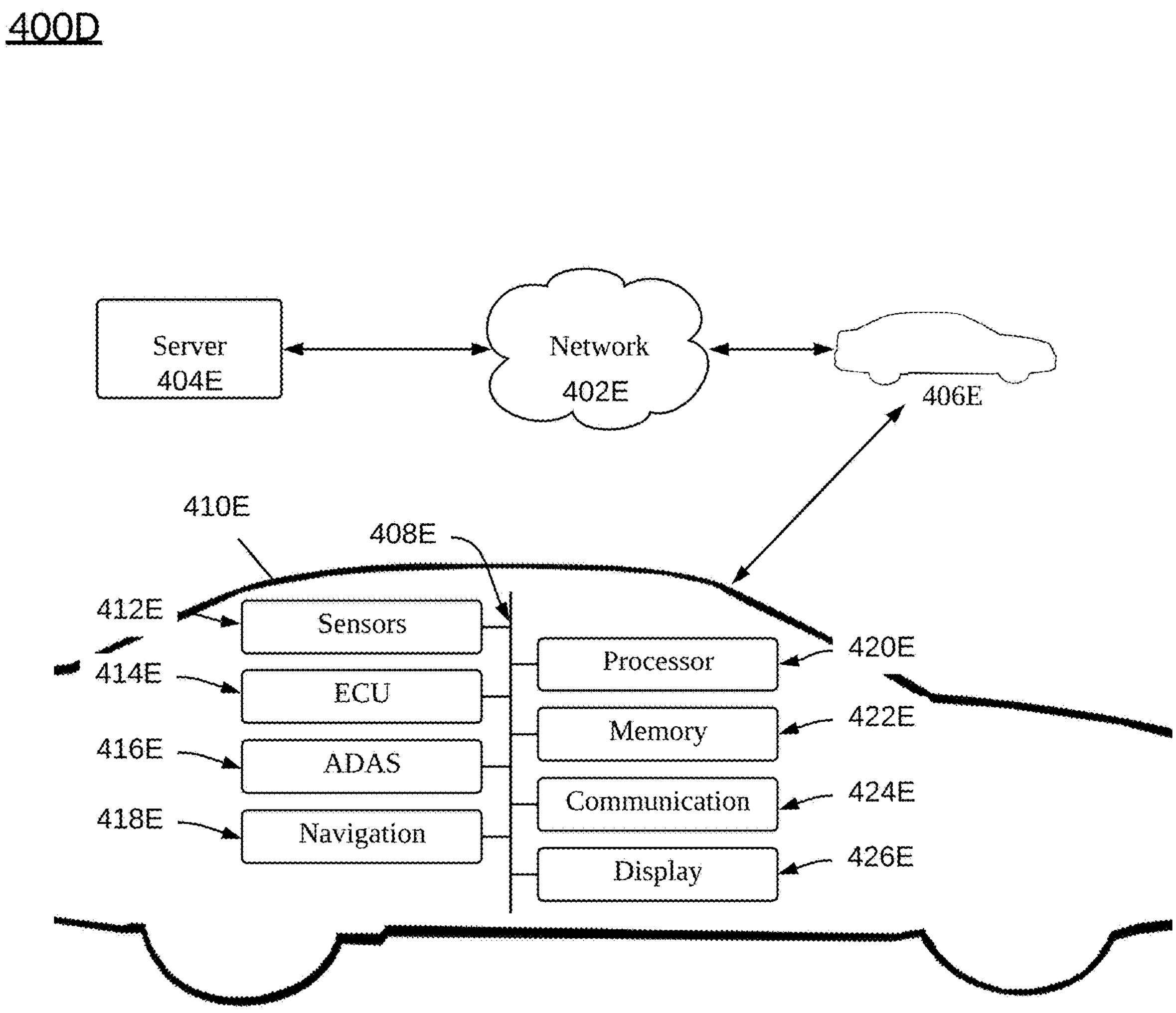
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a CAN bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a compact disc read only memory (CD-ROM) device, a digital versatile disk read only memory (DVD-ROM) device, a digital versatile disk random access memory (DVD-RAM) device, a digital versatile disk rewritable (DVD-RW) device, a flash memory device, or some other mass storage device for storing information on a permanent basis. A portion of the memory 422E may be reserved for use as a buffer or virtual random-access memory (virtual RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Light Detection and Ranging (Lidar) sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a global positioning system (GPS) sensor, a mapping functionality, and any other type of automotive sensor. The navigation system 418E may store the sensor data in the memory 422E.

The communication unit 424E transmits and receives data to and from the network 402E or to another communication channel. In some embodiments, the communication unit 424E may include a dedicated short-range communication (DSRC) transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

ECUs are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as ADAS, sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In one embodiment, a CAN includes a CAN bus with a high and low terminal and a plurality of ECUs, which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decides what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
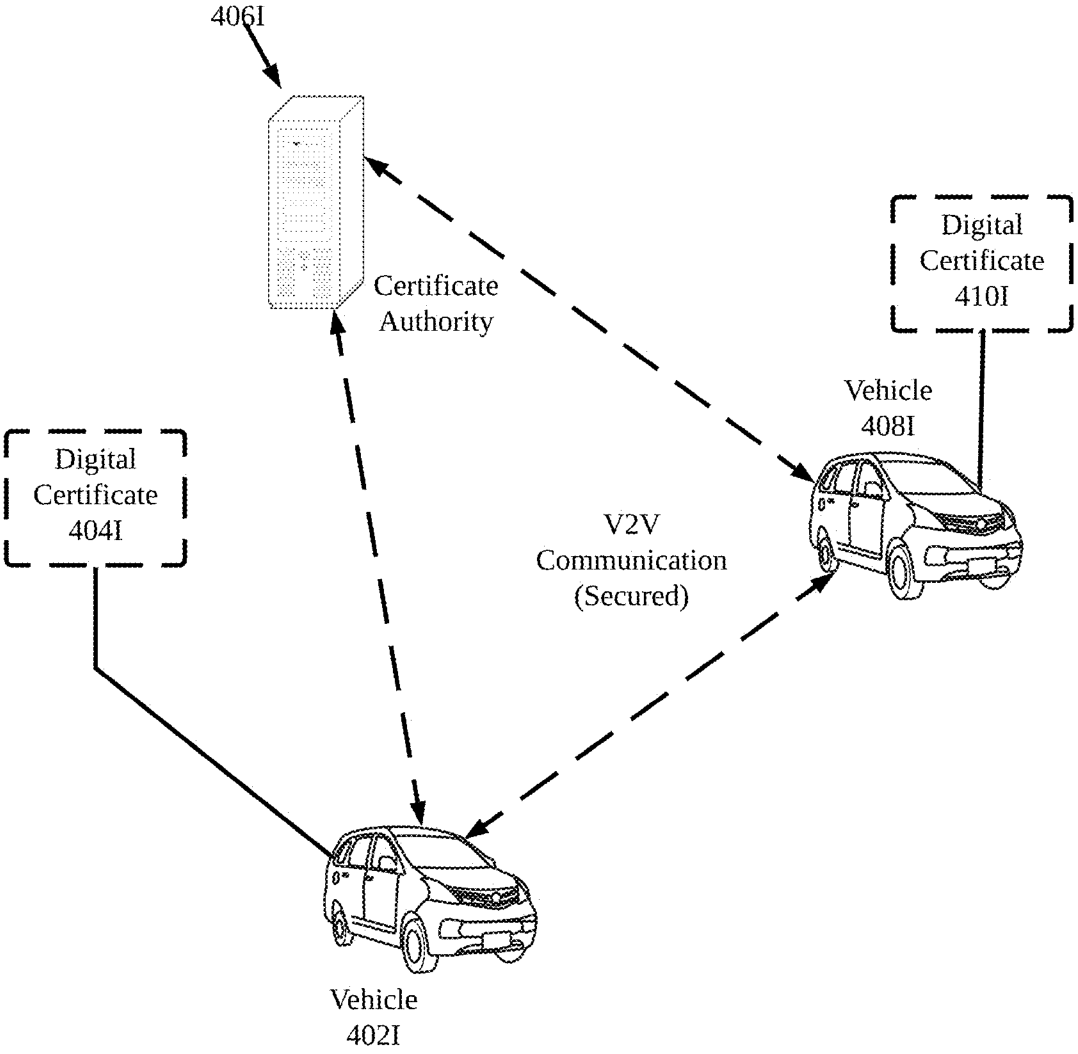
FIG. 4E illustrates yet a further diagram depicting an example of vehicles performing secured Vehicle-to-Vehicle (V2V) communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include a security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module may provide information for authenticating communications between the ECUs. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
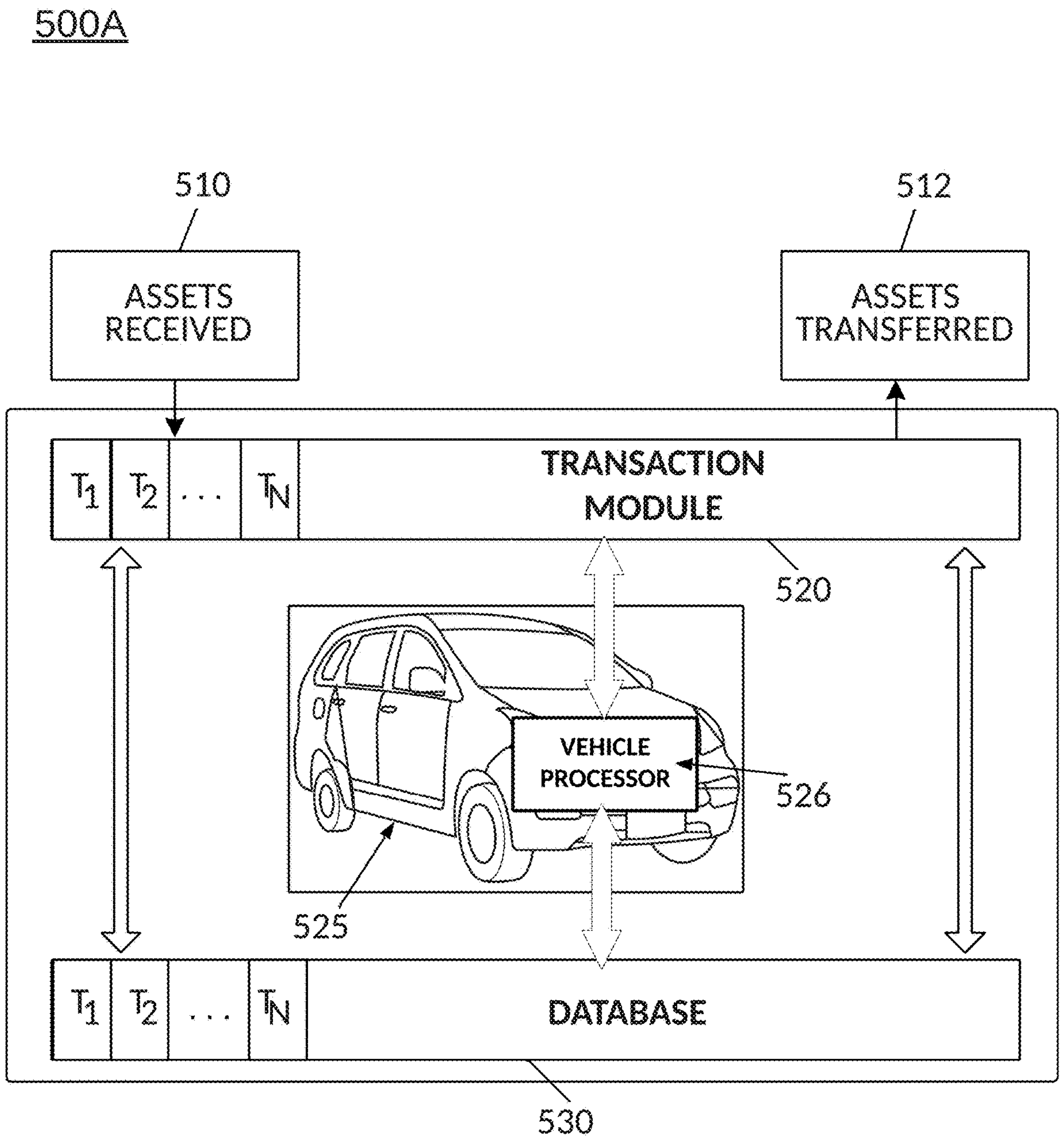
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, a relational database management system (RDBMS), a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in another vehicle and communication exists between the vehicle processor, a second database, the vehicle processor, and a transaction module. The another vehicle may then receive the information via a wireless communication request to perform the package pickup from the vehicle and/or from a server (not shown). The transactions are logged in the transaction modules and of both vehicles. The credits are transferred from the vehicle to the other vehicle and the record of the transferred service is logged in the first database, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
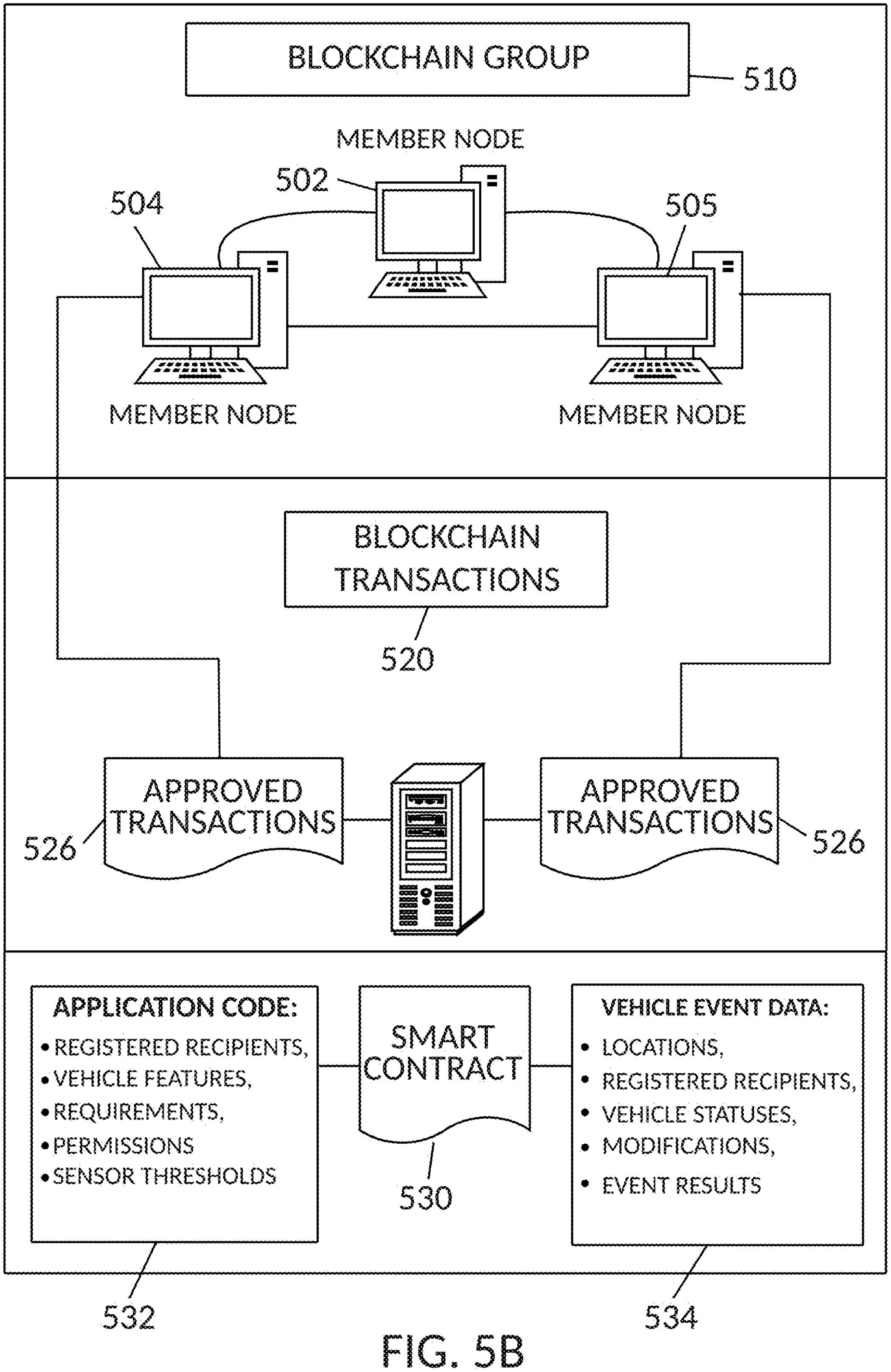
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-505 as part of a blockchain group 510. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes. Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
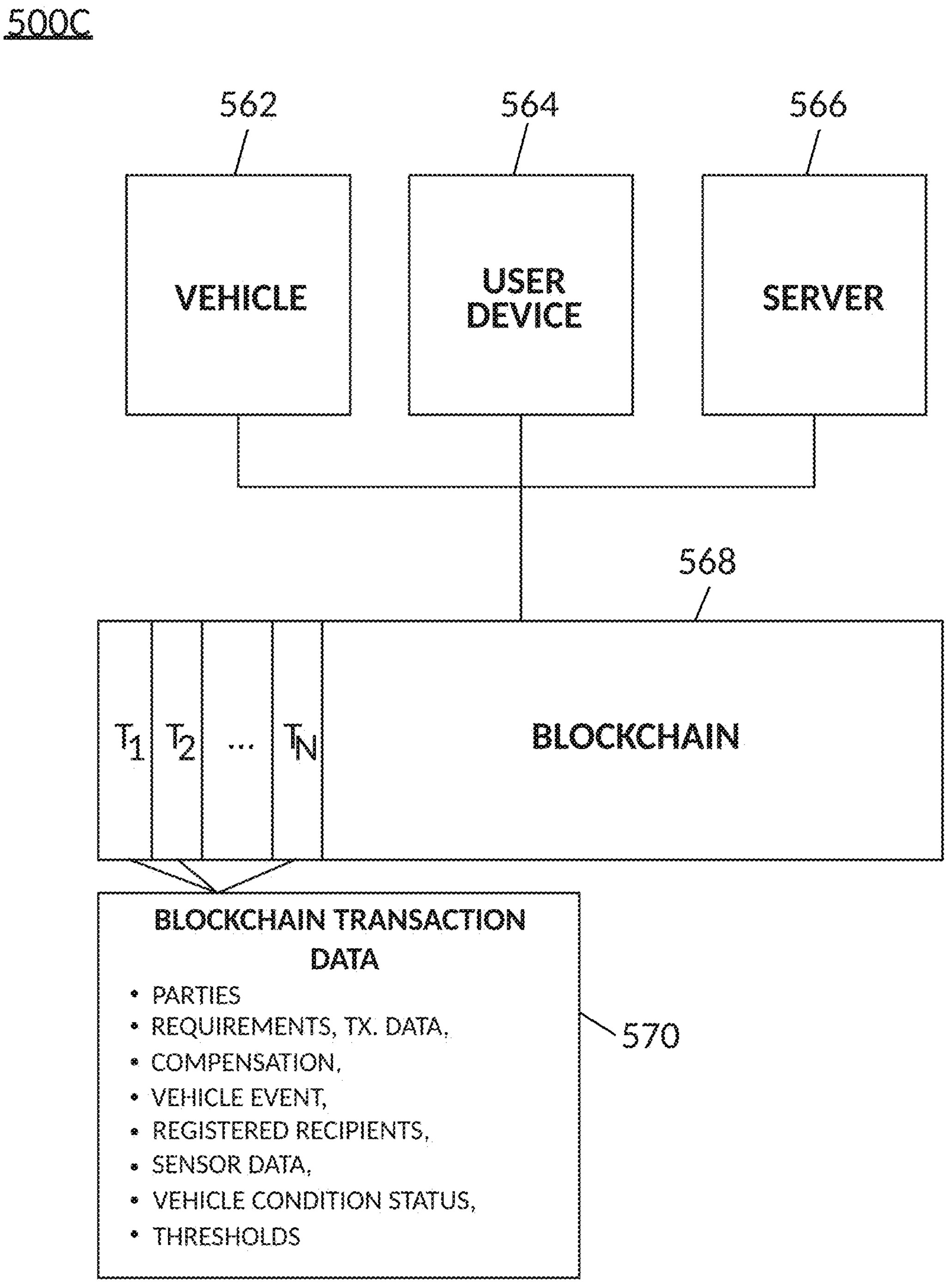
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
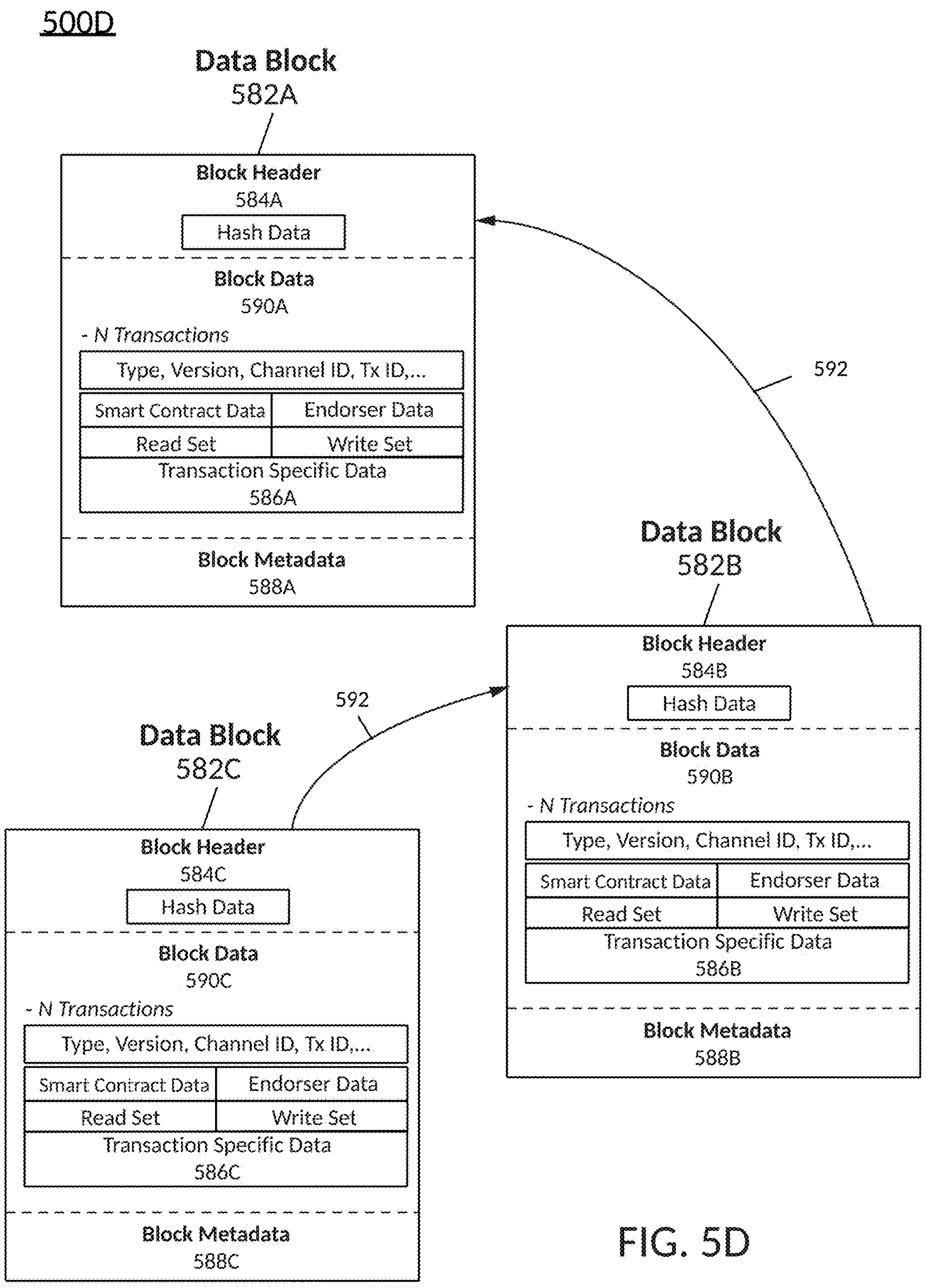
FIG. 5D illustrates an example data block interaction, according to example embodiments.

FIG. 5D illustrates blockchain blocks that can be added to a distributed ledger, according to example embodiments, and contents of block structures 582A to 582*n*. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forwarded by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' becomes a pluggable component.

Entries are written to the distributed ledger in a consistent order. The order of entries is established to ensure that the updates to the state database are valid when they are committed to the network. Unlike a cryptocurrency blockchain system where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584*n*, transaction-specific data 586A to 586*n*, and block metadata 588A to 588*n*. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of n entries (e.g., 100, 500, 1000, 2000, 3000, etc.) within the block data 590A to 590*n*. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data and a validation code identifying whether an entry was valid/invalid.

The other blocks 582B to 582*n* in the blockchain also have headers, files, and values. However, unlike the first block 582A, each of the headers 584A to 584*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
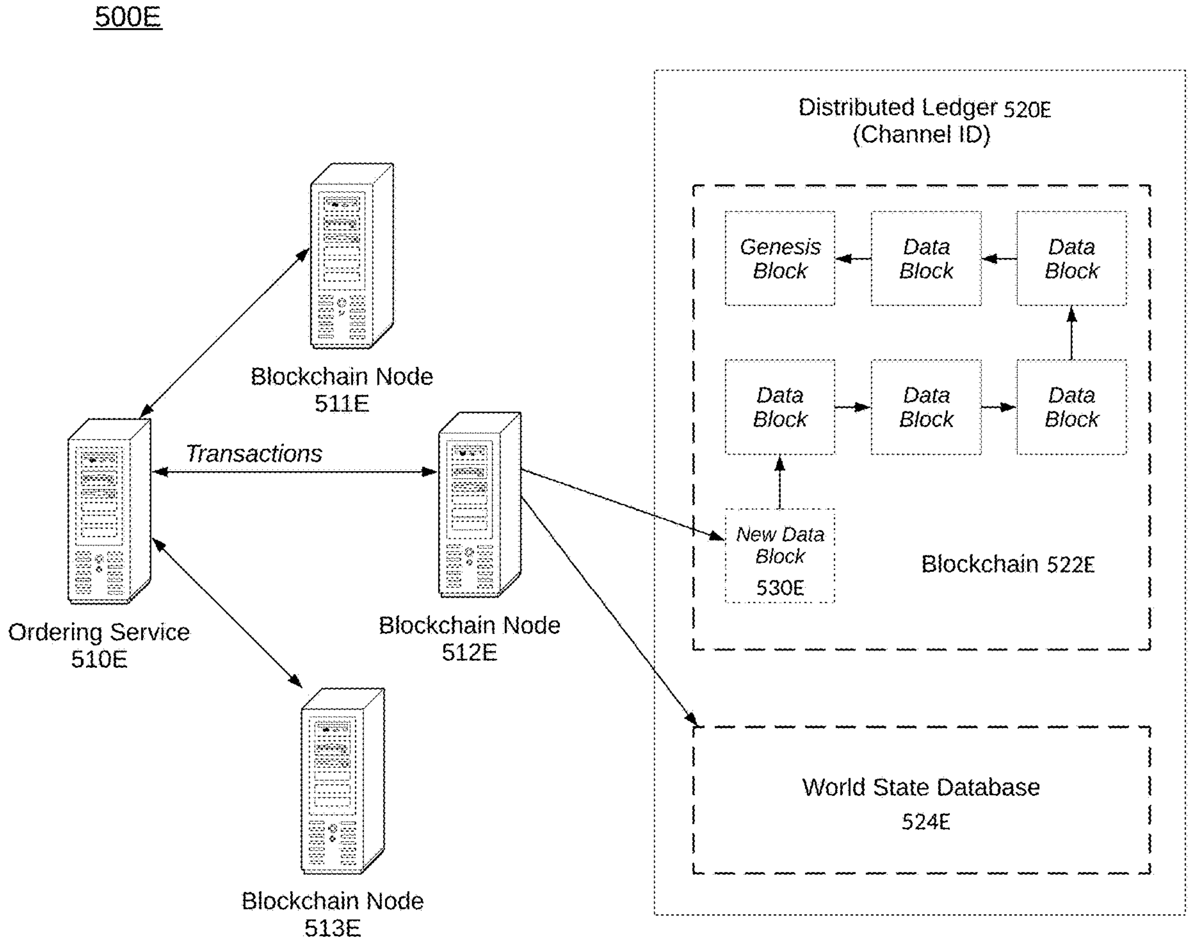
FIG. 5E illustrates a blockchain network diagram, according to example embodiments.

FIG. 5E illustrates a process 500E of a new block being added to a distributed ledger 520E, according to example embodiments, and FIG. 5D illustrates the contents of FIG. 5E's new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 522E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520E. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 520E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, and it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forwarded by the client application to the ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data block 530E for storage on blockchain 522E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 522E. The architecture of the blockchain network may be designed such that the specific implementation of 'ordering' becomes a pluggable component.

Transactions are written to the distributed ledger 520E in a consistent order. The order of transactions is established to ensure that the updates to the state database 524E are valid when they are committed to the network. Unlike a cryptocurrency blockchain system where ordering occurs through the solving of a cryptographic puzzle, or mining, in this example the parties of the distributed ledger 520E may choose the ordering mechanism that best suits the network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
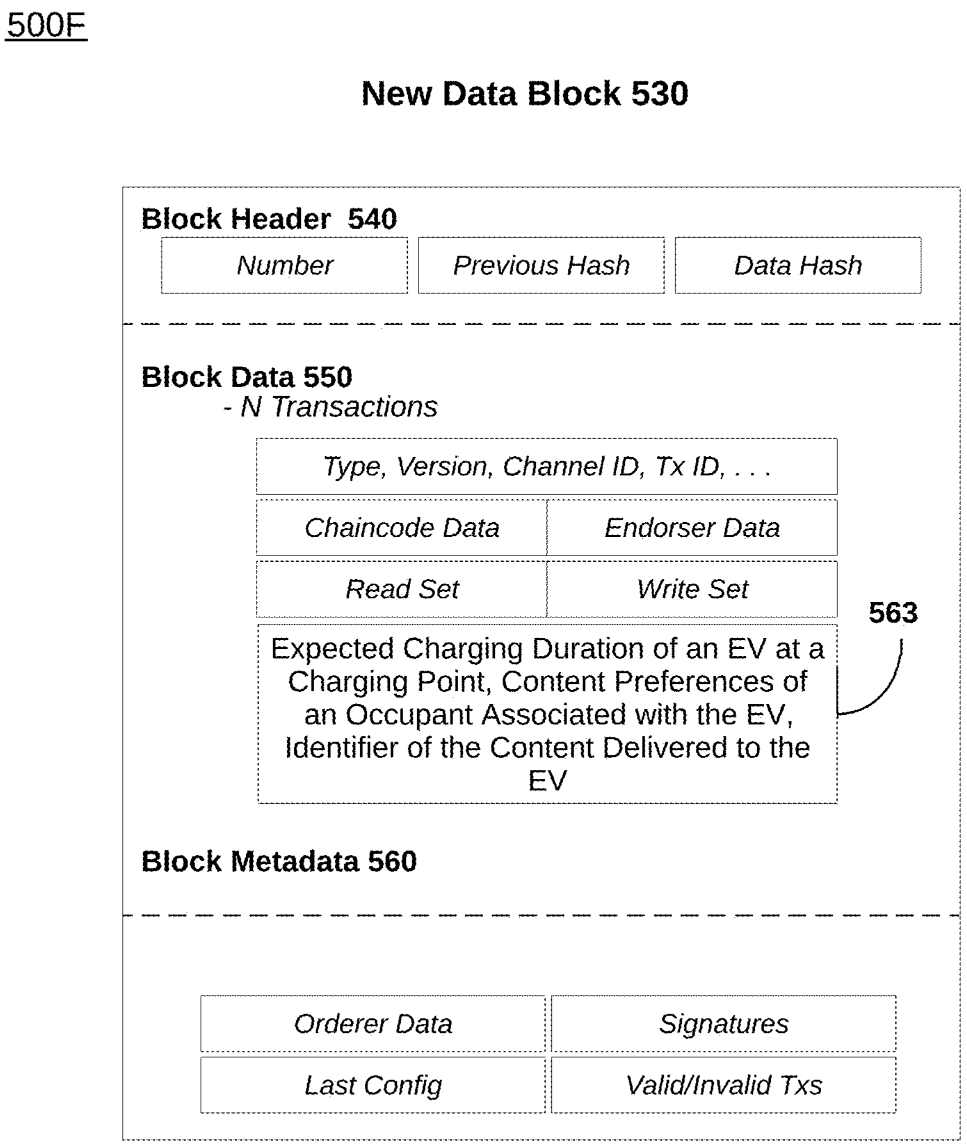
FIG. 5F illustrates an example new data block, according to example embodiments.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents shown in FIG. 5F, are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E (shown in FIG. 5E), a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one embodiment of the instant solution, the block data 563 may include data comprising one or more of determining an expected charging duration of an EV at a charging point; determining content preferences of an occupant associated with the EV, wherein the content preferences are based on profile data of the occupant associated with the occupant; and delivering content to the EV, based on the expected charging duration and the content preferences.

Although in FIG. 5F the blockchain data 563 is depicted in the block data 550 but may also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E in FIG. 5E. Meanwhile, a committer of the block (such as blockchain node 512E in FIG. 5E) may add validity/invalidity information based on an endorsement policy, verification of read/write sets, and the like. The transaction filter may include a byte array of a size equal to the number of transactions in the block data and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
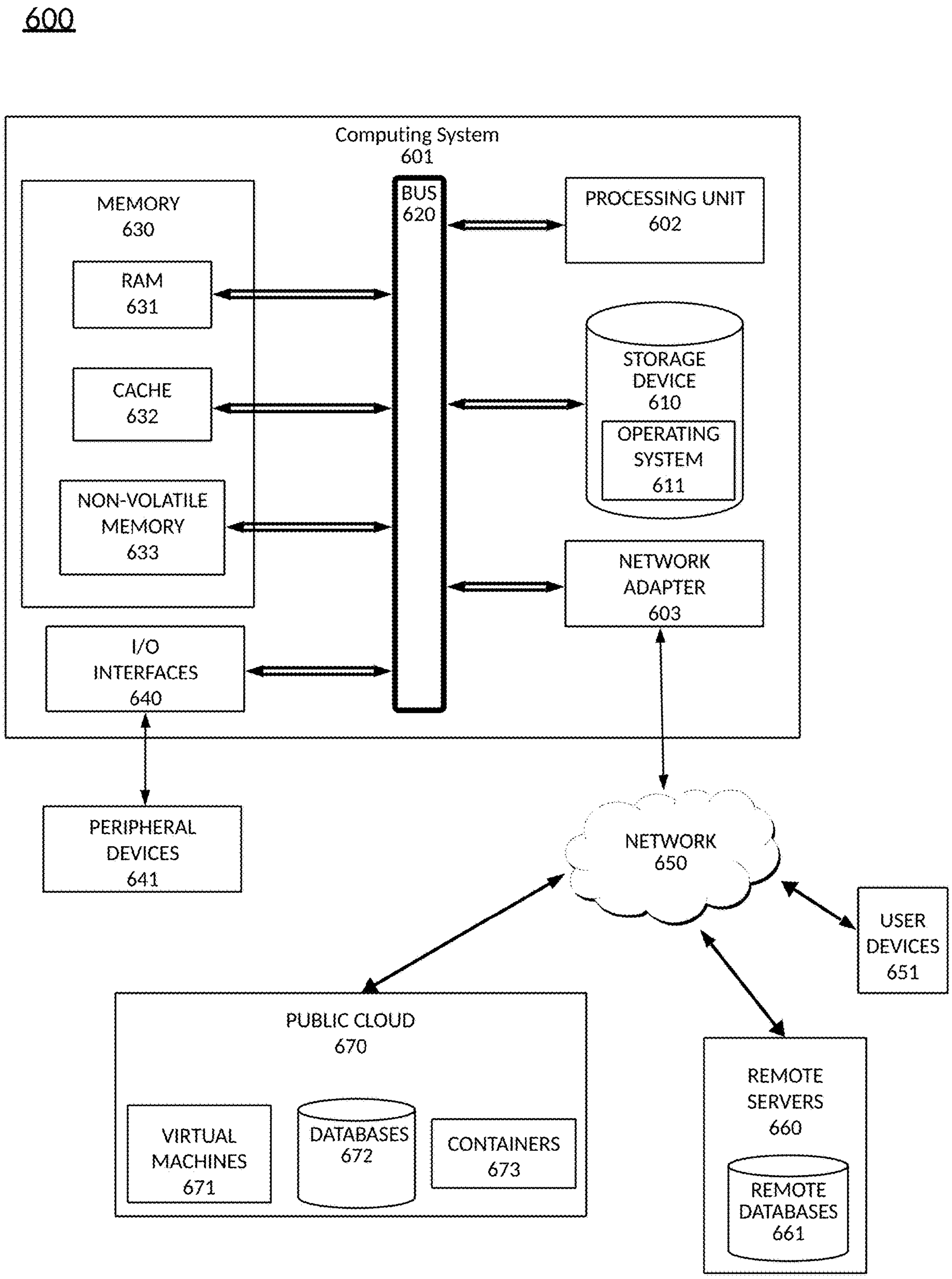
FIG. 6 illustrates an example system that supports one or more of the example embodiments.

FIG. 6 illustrates a computing environment according to example embodiments. FIG. 6 is not intended to suggest any limitation as to the scope of use or functionality of embodiments of the application described herein. Regardless, the computing environment 600 can be implemented to perform any of the functionalities described herein. In computer environment 600, computing system 601 is operational within numerous other general-purpose or special-purpose computing system environments or configurations.

Computing system 601 may take the form of a desktop computer, laptop computer, tablet computer, smartphone, smartwatch or other wearable computer, server computer system, thin client, thick client, network PC, minicomputer system, mainframe computer, quantum computer, and distributed cloud computing environment that include any of the described systems or devices, and the like, or any other form of computer or mobile device now known or to be developed in the future that is capable of running a program, accessing a network 650 or querying a database. Depending upon the technology, the performance of a computer-implemented method may be distributed among multiple computers and between multiple locations. However, in this presentation of the computing environment 600, a detailed discussion is focused on a single computer, specifically computing system 601, to keep the presentation as simple as possible.

Computing system 601 may be located in a cloud, even though it is not shown in a cloud in FIG. 6. On the other hand, computing system 601 is not required to be in a cloud except to any extent as may be affirmatively indicated. Computing system 601 may be described in the general context of computer system-executable instructions, such as program modules, executed by a computing system 601. Generally, program modules may include routines, programs, objects, components, logic, data structures, and so on that perform tasks or implement certain abstract data types. As shown in FIG. 6, computing system 601 in computing environment 600 is shown in the form of a general-purpose computing device. The components of computing system 601 may include but are not limited to, one or more processors or processing units 602, a system memory 630, and a bus 620 that couples various system components, including system memory 630 to processing unit 602.

Processing unit 602 includes one or more computer processors of any type now known or to be developed. The processing unit 602 may contain circuitry distributed over multiple integrated circuit chips. The processing unit 602 may also implement multiple processor threads and multiple processor cores. Cache 632 is a memory that may be in the processor chip package(s) or located "off-chip," as depicted in FIG. 6. Cache 632 is typically used for data or code that the threads or cores running on the processing unit 602 should be available for rapid access. In some computing environments, processing unit 602 may be designed to work with qubits and perform quantum computing.

Network adapter 603 enables the computing system 601 to connect and communicate with one or more networks 650, such as a local area network (LAN), a wide area network (WAN), and/or a public network (e.g., the Internet). It bridges the computer's internal bus 620 and the external network, exchanging data efficiently and reliably. The network adapter 603 may include hardware, such as modems or Wi-Fi signal transceivers, and software for packetizing and/or de-packetizing data for communication network transmission. Network adapter 603 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Computing system 601 may include a removable/non-removable, volatile/non-volatile computer storage device 610. By way of example only, storage device 610 can be a non-removable, non-volatile magnetic media (not shown and typically called a "hard drive"). One or more data interfaces can connect it to the bus 620. In embodiments where computing system 601 is required to have a large amount of storage (for example, where computing system 601 locally stores and manages a large database), then this storage may be provided by storage devices 610 designed for storing very large amounts of data, such as a storage area network (SAN) that is shared by multiple, geographically distributed computers.

The operating system 611 is software that manages computing system 601 hardware resources and provides common services for computer programs. Operating system 611 may take several forms, such as various known proprietary operating systems or open-source Portable Operating System Interface type operating systems that employ a kernel.

The bus 620 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 620 is the signal conduction paths that allow the various components of computing system 601 to communicate with each other.

Memory 630 is any volatile memory now known or to be developed in the future. Examples include dynamic random-access memory (RAM 631) or static type RAM 631. Typically, the volatile memory is characterized by random access, but this is not required unless affirmatively indicated. In computing system 601, memory 630 is in a single package and is internal to computing system 601, but alternatively or additionally, the volatile memory may be distributed over multiple packages and/or located externally with respect to computing system 601. By way of example only, memory 630 can be provided for reading from and writing to a non-removable, non-volatile magnetic media (shown as storage device 610, and typically called a "hard drive"). Memory 630 may include at least one program product having a set (e.g., at least one) of program modules configured to carry out various functions. A typical computing system 601 may include cache 632, a specialized volatile memory generally faster than RAM 631 and generally located closer to the processing unit 602. Cache 632 stores frequently accessed data and instructions accessed by the processing unit 602 to speed up processing time. The computing system 601 may include non-volatile memory 633 in ROM, PROM, EEPROM, and flash memory. Non-volatile memory 633 often contains programming instructions for starting the computer, including the basic input/output system (BIOS) and information required to start the operating system 611.

Computing system 601 may also communicate with one or more peripheral devices 641 via an input/output (I/O) interface 640. Such devices may include a keyboard, a pointing device, a display, etc., one or more devices that enable a user to interact with computing system 601, and/or any devices (e.g., network card, modem, etc.) that enable computing system 601 to communicate with one or more other computing devices. Such communication can occur via I/O interfaces 640. As depicted, I/O interface 640 communicates with the other components of computing system 601 via bus 620.

Network 650 is any computer network that can receive and/or transmit data. Network 650 can include a WAN, LAN, private cloud, or public Internet, capable of communicating computer data over non-local distances by any technology that is now known or to be developed in the future. Any connection depicted can be wired and/or wireless and may traverse other components that are not shown. In some embodiments, a network 650 may be replaced and/or supplemented by LANs designed to communicate data between devices located in a local area, such as a Wi-Fi network. The network 650 typically includes computer hardware such as copper transmission cables, optical transmission fibers, wireless transmission, routers, firewalls, switches, gateway computers, and edge servers. Computing system 601 connects to network 650 via network adapter 603 and bus 620.

User devices 651 are any computer systems used and controlled by an end user in connection with computing system 601. For example, in a hypothetical case where computing system 601 is designed to provide a recommendation to an end user, this recommendation may typically be communicated from network adapter 603 of computing system 601 through network 650 to a user device 651, allowing user device 651 to display, or otherwise present, the recommendation to an end user. User devices can be a wide array of devices, including PCs, laptops, tablet, hand-held, mobile phones, etc.

Remote servers 660 are any computers that serve at least some data and/or functionality over a network 650, for example, WAN, a virtual private network (VPN), a private cloud, or via the Internet to computing system 601. These networks 650 may communicate with a LAN to reach users. The user interface may include a web browser or an application that facilitates communication between the user and remote data. Such applications have been called "thin" desktops or "thin clients." Thin clients typically incorporate software programs to emulate desktop sessions. Mobile applications can also be used. Remote servers 660 can also host remote databases 661, with the database located on one remote server 660 or distributed across multiple remote servers 660. Remote databases 661 are accessible from database client applications installed locally on the remote server 660, other remote servers 660, user devices 651, or computing system 601 across a network 650.

A public cloud 670 is an on-demand availability of computer system resources, including data storage and computing power, without direct active management by the user. Public clouds 670 are often distributed, with data centers in multiple locations for availability and performance. Computing resources on public clouds (670) are shared across multiple tenants through virtual computing environments comprising virtual machines 671, databases 672, containers 673, and other resources. A container 673 is an isolated, lightweight software for running an application on the host operating system 611. Containers 673 are built on top of the host operating system's kernel and contain only applications and some lightweight operating system APIs and services. In contrast, virtual machine 671 is a software layer that includes a complete operating system 611 and kernel. Virtual machines 671 are built on top of a hypervisor emulation layer designed to abstract a host computer's hardware from the operating software environment. Public clouds 670 generally offer hosted databases 672 abstracting high-level database management activities. It should be further understood that one or more of the elements described or depicted in FIG. 6 can perform one or more of the actions, functionalities, or features described or depicted herein.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
- determining a connection between an electric vehicle (EV) and a charging point exists;
- determining an expected charging duration of the EV at the charging point;
- determining display characteristics of at least one display device of an infotainment system of the EV;
- transmitting the expected charging duration, the display characteristics, and content preferences from the EV to the charging point;
- delivering, by the charging point, content to the EV, based on the expected charging duration, the display characteristics, and the content preferences; and
- delivering, by the EV, the content to a display of the at least one display device, wherein the display is proximate at least one occupant.

2. The method of claim 1, wherein determining the content preferences of the at least one occupant comprises collecting data from a device associated with the at least one occupant, the data comprising at least one of historical content viewing times, historical content viewing lengths, interactive content responses, and content download preferences.

3. The method of claim 1, wherein delivering the content to the EV comprises prioritizing the content based on an urgency parameter, wherein the urgency parameter is related to a relevance of the content to the at least one occupant being above a threshold.

4. The method of claim 1, wherein delivering the content to the EV comprises delivering the content to a plurality of devices of a plurality of occupants within the EV, wherein the content is differentiated for each occupant of the plurality of occupants based on profile data of the plurality of occupants.

5. The method of claim 1, wherein the delivering the content to the EV comprises:
- determining if the at least one occupant is in the EV; and
- determining a length of time the at least one occupant will remain in the EV.

6. The method of claim 1, wherein the delivering the content to the EV comprises:
- determining if one or more other occupants are in the EV; and
- determining if content preferences of the one or more other occupants are similar to the content preferences of the at least one occupant.

7. The method of claim 1, comprising adjusting the expected charging duration based on one or more of a temperature at a location of the EV or a demand of an energy provider, and performance metrics associated with the charging point.

8. A system, comprising:
- at least one processor; and
- a memory, wherein the at least one processor and the memory are communicably coupled,
- wherein the at least one processor performs:
  - determine a connection between an electric vehicle (EV) and a charging point exists;
  - determine an expected charging duration of the EV at the charging point;
  - determine display characteristics of at least one display device of an infotainment system of the EV;
  - transmit the expected charging duration, the display characteristics, and content preferences from the EV to the charging point;
  - deliver, by the charging point, content to the EV, based on the expected charging duration, the display characteristics, and the content preferences; and
  - deliver, by the EV, the content to a display of the at least one display device, wherein the display is proximate at least one occupant.

9. The system of claim 8, wherein the at least one processor is configured to collect data from a device associated with the at least one occupant, the data comprises at least one of historical content viewing times, historical content viewing lengths, interactive content responses, and content download preferences.

10. The system of claim 8, wherein deliver the content to the EV comprises prioritize the content based on an urgency parameter, wherein the urgency parameter is related to a relevance of the content to the at least one occupant above a threshold.

11. The system of claim 8, wherein deliver the content to the EV comprises deliver the content to a plurality of devices of a plurality of occupants within the EV, wherein the content is differentiated for each occupant of the plurality of occupants based on profile data of the plurality of occupants.

12. The system of claim 8, wherein the deliver the content to the EV comprises:
- determine if the at least one occupant is in the EV; and
- determine a length of time the at least one occupant will remain in the EV.

13. The system of claim 8, wherein the deliver the content to the EV comprises:
- determine if one or more other occupants are in the EV; and
- determine if content preferences of the one or more other occupants are similar to the content preferences of the at least one occupant.

14. The system of claim 8, wherein the at least one processor is configured to adjust the expected charging duration based on one or more of a temperature at a location of the EV or a demand of an energy provider, and performance metrics associated with the charging point.

15. A non-transitory computer readable storage medium comprising instructions, that when read by a processor, cause the processor to perform:
- determining a connection between an electric vehicle (EV) and a charging point exists;
- determining an expected charging duration of the EV at the charging point;
- determining display characteristics of at least one display device of an infotainment system of the EV;
- transmitting the expected charging duration, the display characteristics, and content preferences from the EV to the charging point;
- delivering, by the charging point, content to the EV, based on the expected charging duration, the display characteristics, and the content preferences; and
- delivering, by the EV, the content to a display of the at least one display device, wherein the display is proximate at least one occupant.

16. The non-transitory computer readable storage medium of claim 15, wherein determining the content preferences of the at least one occupant comprises collecting data from a device associated with the at least one occupant, the data comprising at least one of historical content viewing times, historical content viewing lengths, interactive content responses, and content download preferences.

17. The non-transitory computer readable storage medium of claim 15, wherein delivering the content to the EV, comprises prioritizing the content based on an urgency parameter, wherein the urgency parameter is related to a relevance of the content to the at least one occupant being above a threshold.

18. The non-transitory computer readable storage medium of claim 15, wherein delivering the content to the EV, comprises delivering the content to a plurality of devices of a plurality of occupants within the EV, wherein the content is differentiated for each occupant of the plurality of occupants based on profile data of the plurality of occupants.

19. The non-transitory computer readable storage medium of claim 15, wherein delivering the content to the EV comprises:

determining if the at least one occupant is in the EV; and determining a length of time the at least one occupant will remain in the EV.

20. The non-transitory computer readable storage medium of claim 15, wherein delivering the content to the EV, comprises:

determining if one or more other occupants are in the EV; and determining if content preferences of the one or more other occupants are similar to the content preferences of the at least one occupant.

* * * * *